United States Patent
Cho et al.

(10) Patent No.: US 10,334,233 B2
(45) Date of Patent: Jun. 25, 2019

(54) PORTABLE DEVICE THAT CONTROLS PHOTOGRAPHY MODE, AND CONTROL METHOD THEREFOR

(71) Applicant: LG ELECTRONICS INC., Seoul (KR)

(72) Inventors: Eunhyung Cho, Seoul (KR); Doyoung Lee, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 15/322,657

(22) PCT Filed: Jul. 9, 2014

(86) PCT No.: PCT/KR2014/006161
§ 371 (c)(1),
(2) Date: Dec. 28, 2016

(87) PCT Pub. No.: WO2016/006731
PCT Pub. Date: Jan. 14, 2016

(65) Prior Publication Data
US 2017/0142407 A1    May 18, 2017

(51) Int. Cl.
*H04N 5/225* (2006.01)
*H04N 13/289* (2018.01)
(Continued)

(52) U.S. Cl.
CPC ........... *H04N 13/289* (2018.05); *G06F 3/017* (2013.01); *H04N 13/204* (2018.05); *H04N 13/296* (2018.05); *H04N 13/30* (2018.05)

(58) Field of Classification Search
CPC .. H04N 13/289; H04N 13/204; H04N 13/296; H04N 13/30; G06F 3/017
See application file for complete search history.

(56) References Cited

U.S. PATENT DOCUMENTS 6,864,910 B1 * 3/2005 Ogino ................. H04N 13/211
348/42
8,558,759 B1   10/2013 Prada Gomez et al.
(Continued)

FOREIGN PATENT DOCUMENTS

JP    2004-205711 A    7/2004
JP    2008-17501 A    1/2008
(Continued)

OTHER PUBLICATIONS

Igorevich et al., "Two Hand Gesture Recognition Using Stereo Camera," International Journal of Computer and Electrical Engineering, vol. 5, No. 1, Feb. 2013 (Jan. 1, 2013), pp. 69-72, XP055132668.

*Primary Examiner* — Howard D Brown, Jr.
(74) *Attorney, Agent, or Firm* — Birch, Stewart, Kolasch & Birch, LLP

(57) ABSTRACT

The present specification relates to a portable device that controls a photography mode, and a control method therefor. A control method of a portable device that controls a photography mode according to an embodiment may comprise the steps of: detecting a first marker at a first distance from the portable device and a second marker at a second distance using at least one of a first camera unit and a second camera unit; and executing a photography mode that captures an image. A 2D photography mode is executed if the first distance of the detected first marker and the second distance of the detected second marker are effectively the same; and a 3D photography mode is executed if the first distance of the detected first marker and the second distance of the detected second marker are different, wherein the 3D photography mode may be a mode that generates a 3D image using binocular disparity of the first camera unit and the second camera unit.

17 Claims, 25 Drawing Sheets

(51) Int. Cl.
*G06F 3/01* (2006.01)
*H04N 13/30* (2018.01)
*H04N 13/296* (2018.01)
*H04N 13/204* (2018.01)

(56) References Cited

U.S. PATENT DOCUMENTS

| | | | | |
|---|---|---|---|---|
| 2005/0094019 | A1* | 5/2005 | Grosvenor | G03B 17/00 348/335 |
| 2011/0090313 | A1* | 4/2011 | Tsuchita | H04N 13/0239 348/46 |
| 2012/0069152 | A1* | 3/2012 | Kusaka | H04N 13/0022 347/47 |
| 2012/0113216 | A1* | 5/2012 | Seen | H04N 5/23293 348/38 |
| 2012/0147145 | A1* | 6/2012 | Yamaguchi | H04N 13/189 348/47 |
| 2012/0293544 | A1 | 11/2012 | Miyamoto et al. | |
| 2012/0307021 | A1* | 12/2012 | Tsai | G01B 11/2513 348/50 |
| 2012/0321171 | A1* | 12/2012 | Ito | H04N 13/128 382/154 |
| 2013/0321462 | A1* | 12/2013 | Salter | G06F 1/163 345/633 |
| 2014/0355830 | A1* | 12/2014 | Park | G06K 9/00228 382/103 |

FOREIGN PATENT DOCUMENTS

| | | |
|---|---|---|
| KR | 10-2012-0122314 A | 11/2012 |
| KR | 10-2012-0126897 A | 11/2012 |
| KR | 10-2013-0127301 A | 11/2013 |
| KR | 10-2014-0029864 A | 3/2014 |
| WO | WO 2013/121807 A1 | 8/2013 |

* cited by examiner

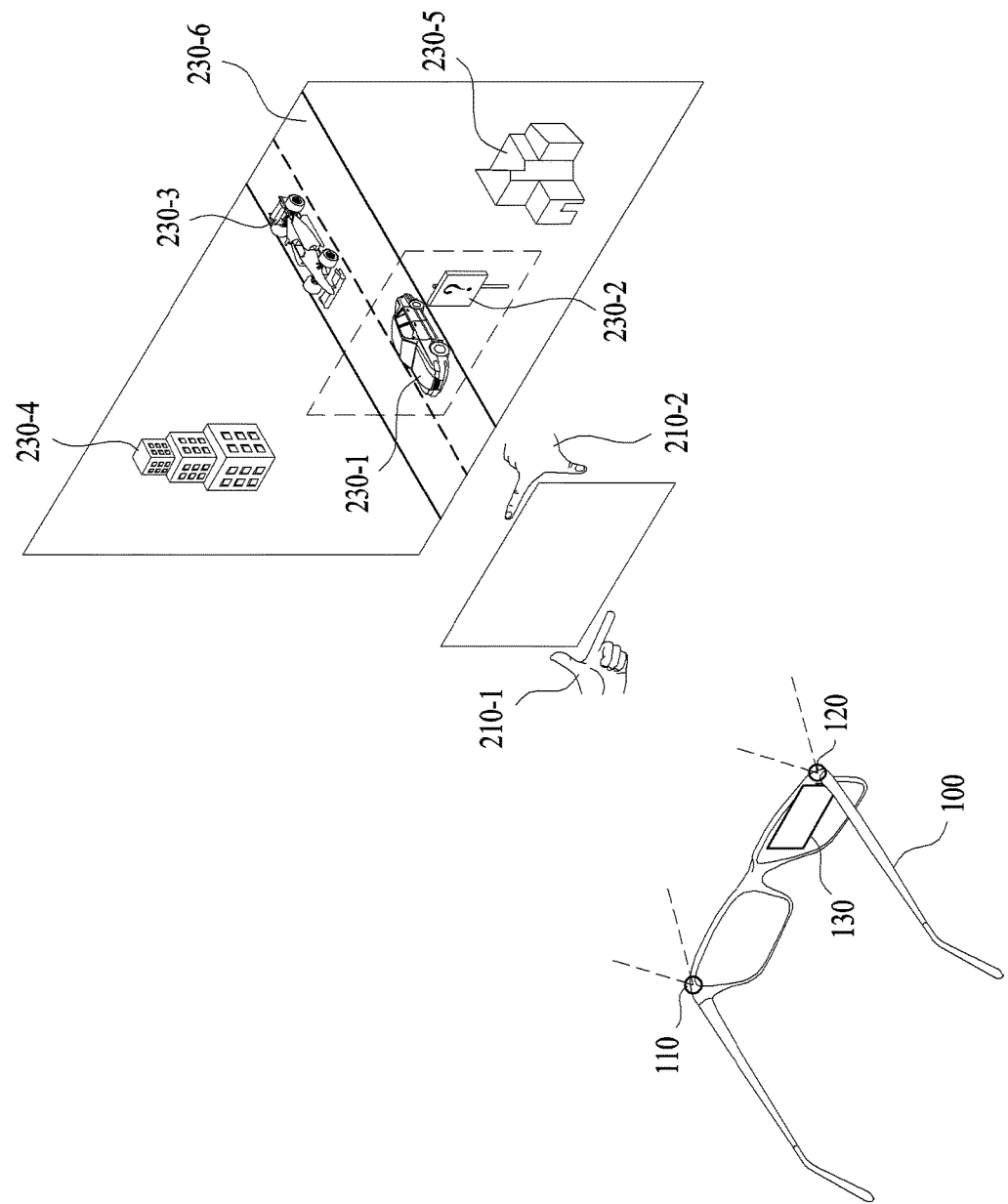

2D image

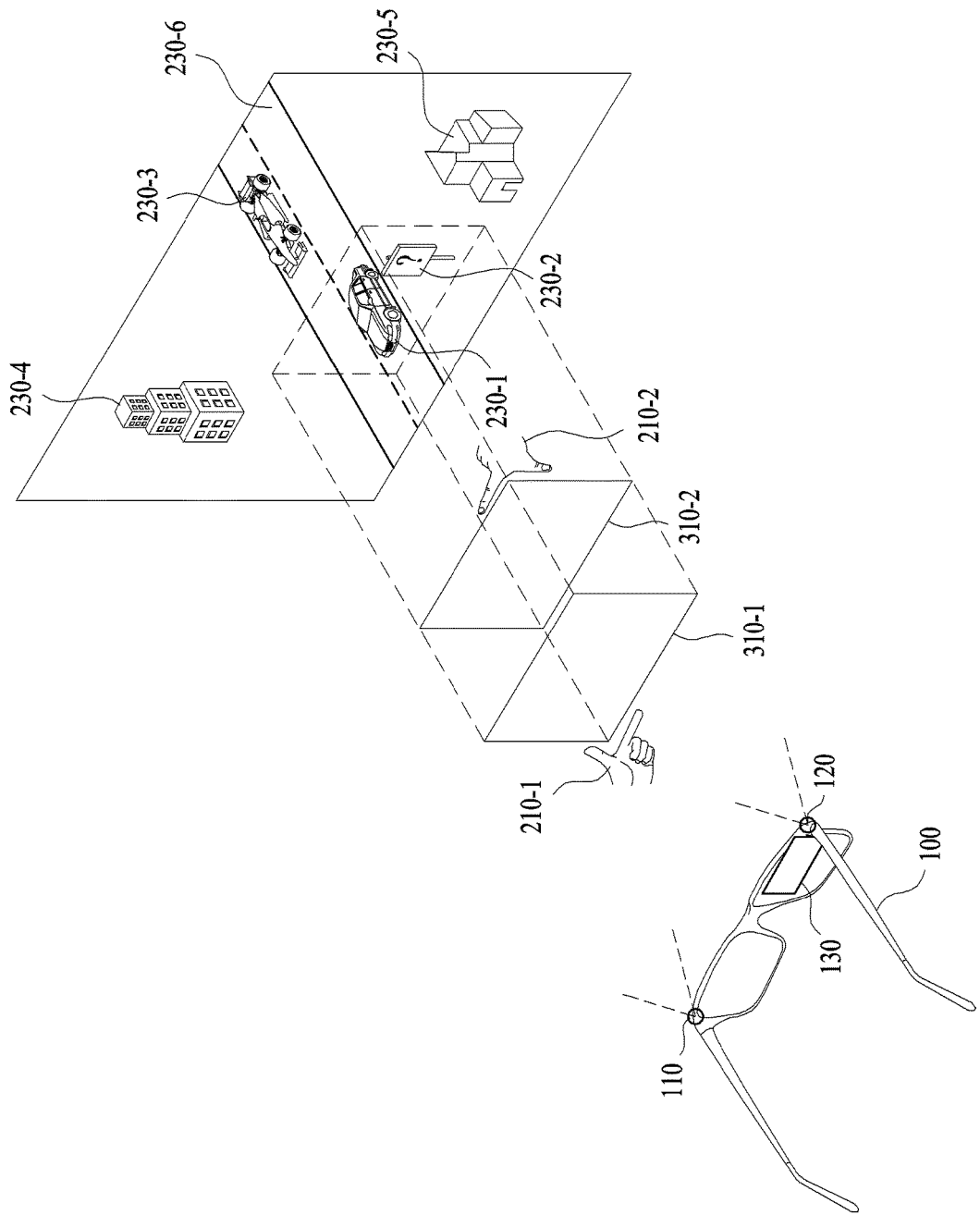

Generation of 2D image based on 2D photography mode

Generation of 3D image by focusing on first 3D object

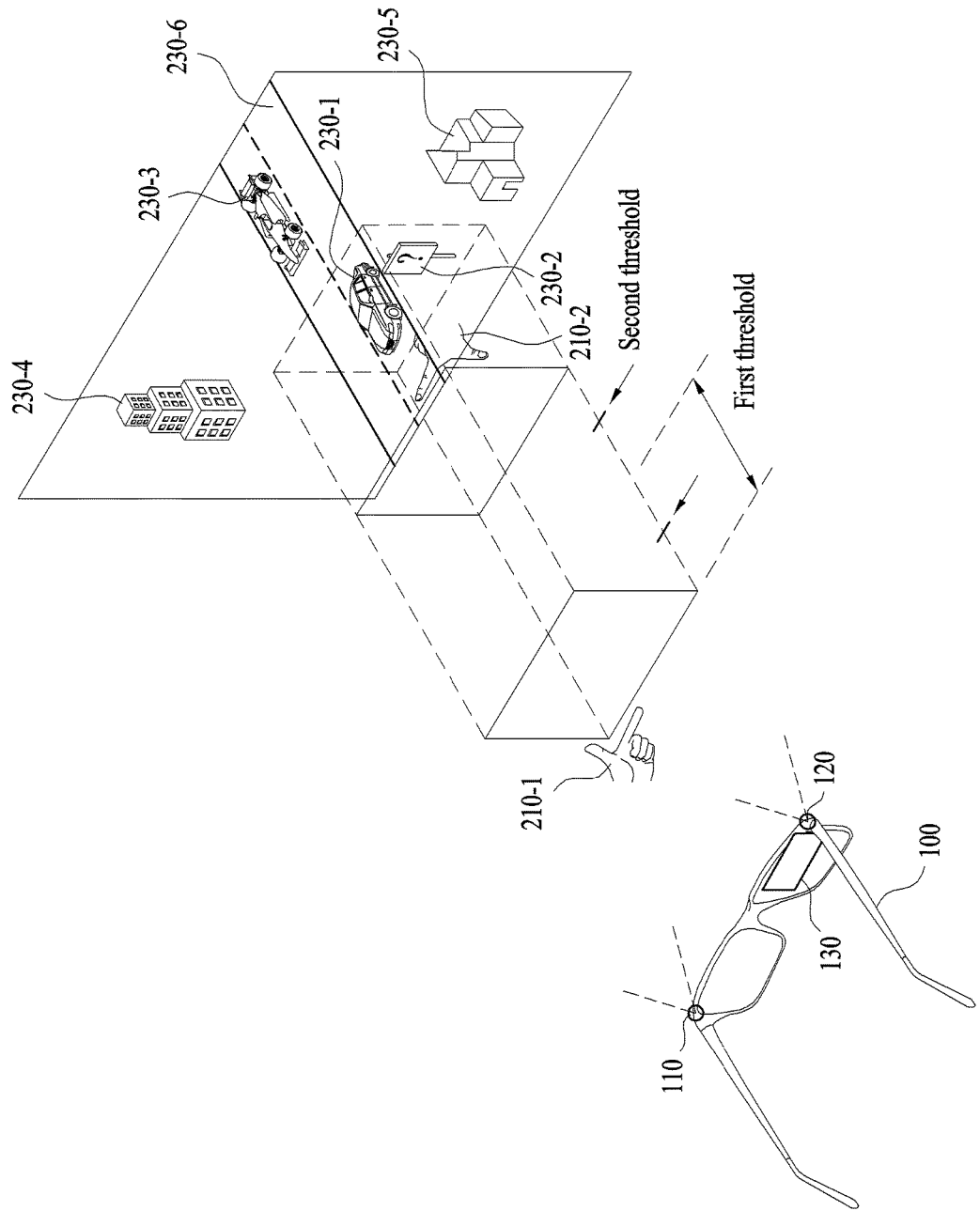

Generation of 3D image by focusing on second 3D object

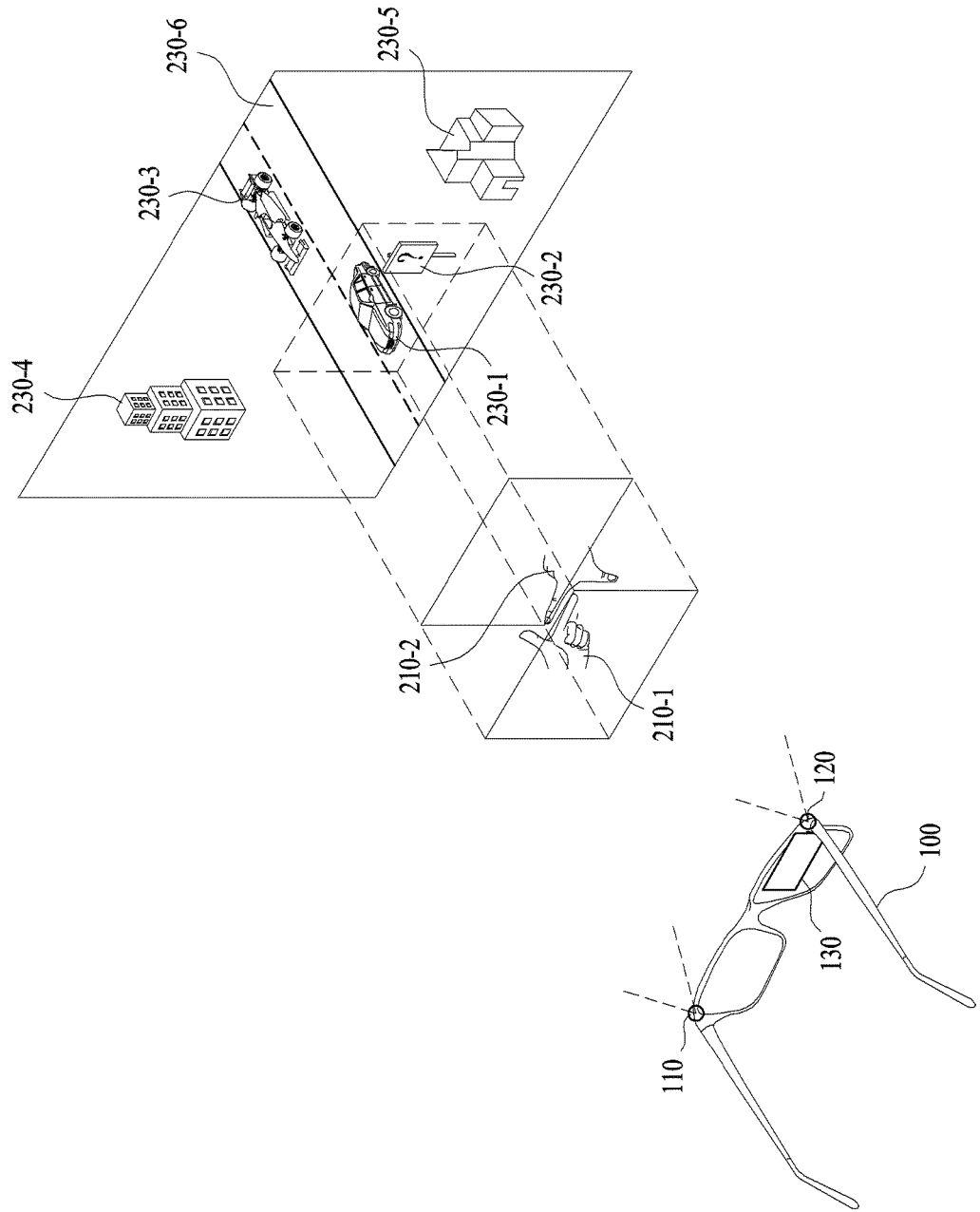

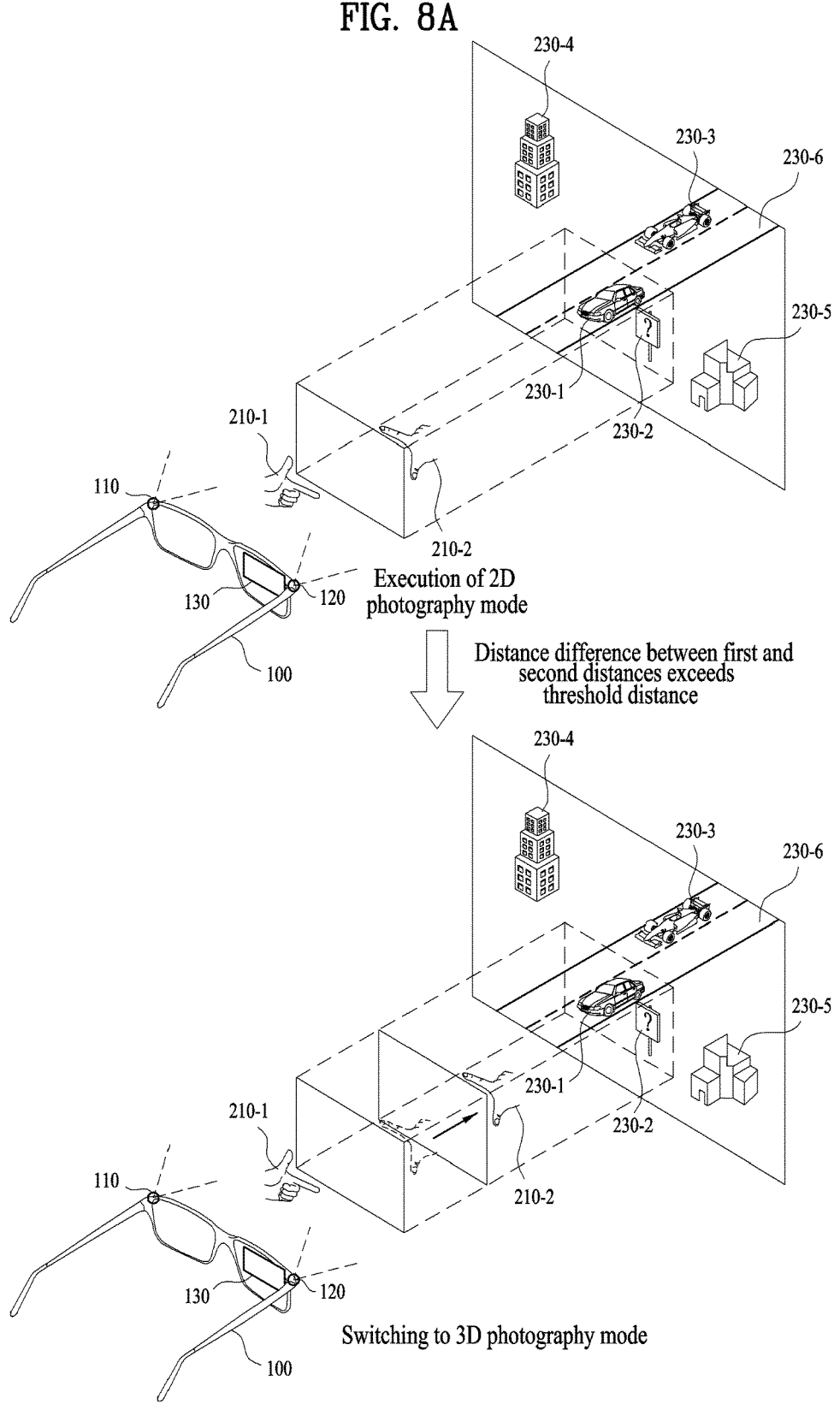

FIG. 8B
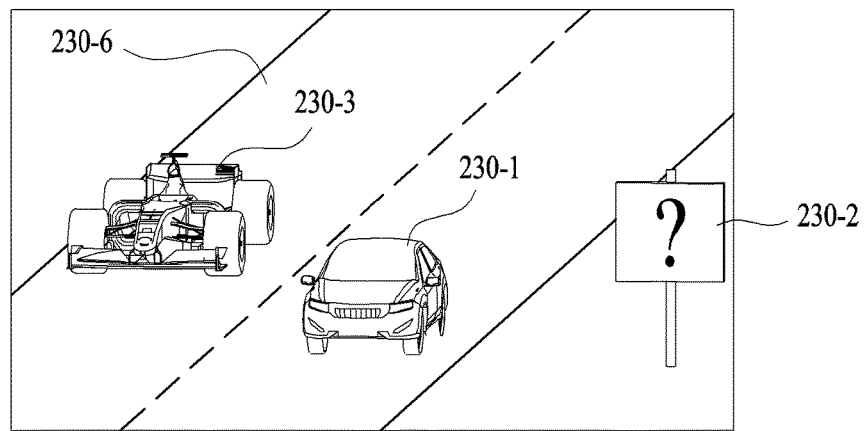
[Preview Image–2D photography mode]
Distance difference between first and second distances exceeds threshold distance
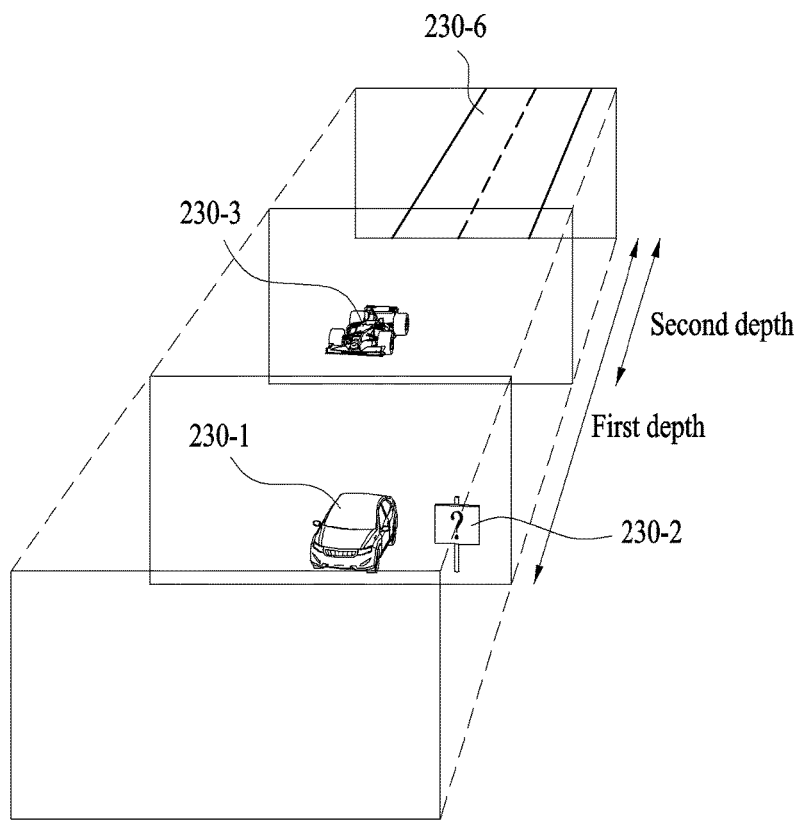
[Preview Image–3D photography mode]

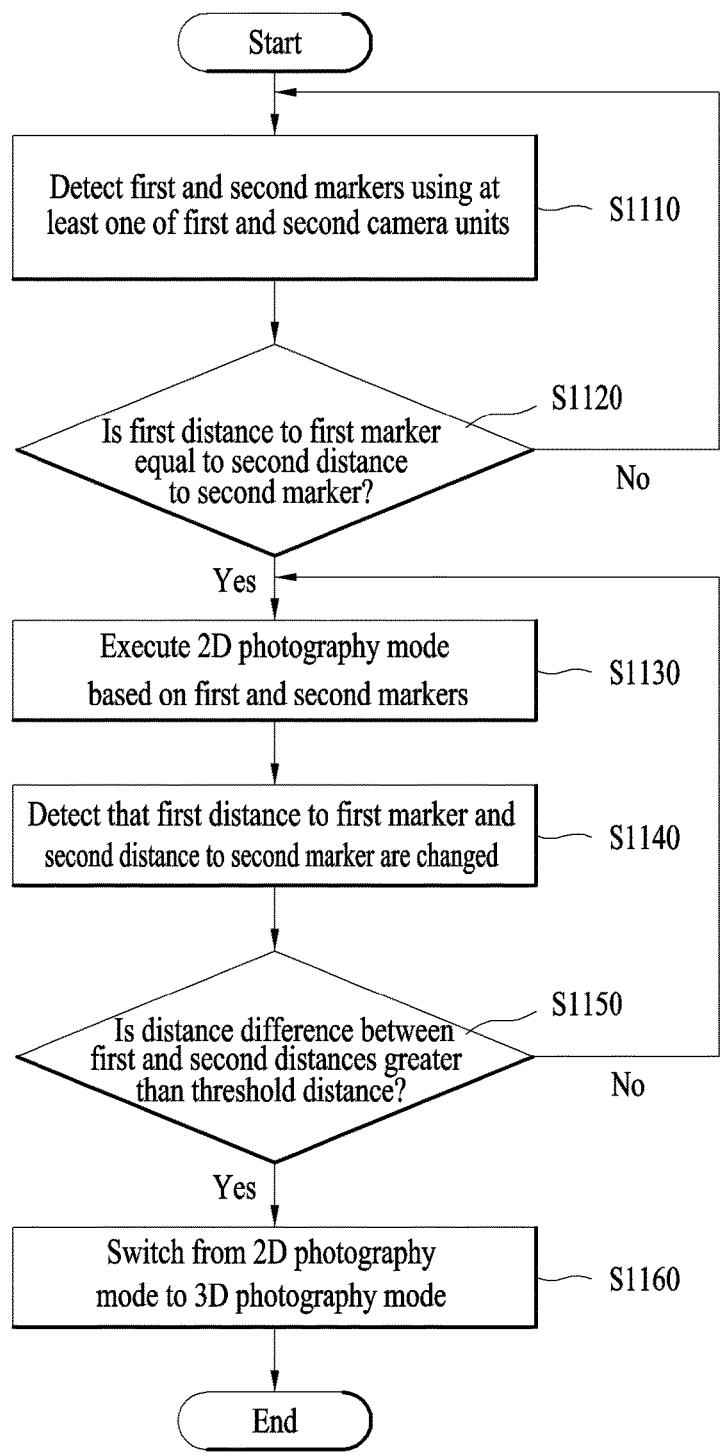

PORTABLE DEVICE THAT CONTROLS PHOTOGRAPHY MODE, AND CONTROL METHOD THEREFOR

CROSS REFERENCE TO RELATED APPLICATIONS

This application is the National Phase of PCT/KR2014/006161 filed on Jul. 9, 2014, which is hereby expressly incorporated by reference into the present application.

TECHNICAL FIELD

The present invention relates to a portable device for controlling a photography mode and controlling method therefor.

BACKGROUND ART

A portable device could capture a 2D image. Recently, such a portable device has been developed so that it can capture a 3D image as well. In detail, the portable device can capture images using a plurality of cameras and then create the 3D image using a plurality of the captured images. Through the above process, the portable device can capture the 3D image. In the case, the portable device can capture the 3D image in a different manner according to arrangement of a plurality of camera units.

Due to the introduction of such a scheme for capturing a 3D image, a method for controlling a photography mode of a portable device needs to be researched. More particularly, a method for determining whether an image is captured as a 2D image or a 3D image in case of capturing the image using a portable device is required.

DISCLOSURE OF THE INVENTION

Technical Task

One object of the present invention is to provide a portable device for controlling a photography mode and controlling method therefor.

Another object of the present invention is to provide a portable device for detecting a plurality of markers and configuring a photography mode based on a distance from the portable device to the plurality of the markers and method for the same.

Still another object of the present invention is to provide a portable device for executing a 2D photography mode for capturing a 2D image when a plurality of markers are at substantially the same distance from the portable device and method for the same.

A further object of the present invention is to provide a portable device for executing a 3D photography mode for capturing a 3D image when a plurality of markers are at different distances from the portable device and method for the same.

It is a further object of the present invention to provide a portable device for generating a 3D image using binocular parallax of a plurality of camera units included therein and method for the same.

Still a further object of the present invention is to provide a portable device for configuring a focused object based on a distance to a marker in a 3D image in which a plurality of 3D objects are included and method for the same.

It is still a further object of the present invention to provide a portable device for generating a 3D image including a plurality of 3D objects with different depths and method for the same.

Furthermore, it is a further object of the present invention is to provide a portable device for switching from a 2D photography mode to a 3D photography mode if a distance to a marker is changed after execution of the 2D photography mode and method for the same.

Still furthermore, it is a further object of the present invention is to provide a portable device for returning to a 2D photography mode in a state in which a 3D photography mode is executed.

Technical Solutions

In one aspect of the present invention, provided is a portable device, including first and second camera units for capturing images and a processor for controlling the first and second camera units, wherein the processor detects a first marker positioned at a first distance from the portable device and a second marker positioned at a second distance from the portable device by using at least one of the first and second camera units, executes a 2D photography mode if the first distance to the detected first marker is substantially equal to the second distance to the detected second marker, and executes a 3D photography mode if the first distance to the detected first marker is different from the second distance to the detected second marker. In this case, the 3D photography mode may be a mode for generating a 3D image by using binocular parallax of the first and second camera units.

In another aspect of the present invention, provided is a controlling method for a portable device, including: detecting a first marker positioned at a first distance from the portable device and a second marker positioned at a second distance from the portable device by using at least one of first and second camera units; and executing a photography mode for capturing an image. In this case, if the first distance to the detected first marker is substantially equal to the second distance to the detected second marker, a 2D photography mode may be executed. On the contrary, if the first distance to the detected first marker is different from the second distance to the detected second marker, a 3D photography mode may be executed. In this case, the 3D photography mode may be a mode for generating a 3D image by using binocular parallax of the first and second camera units.

Advantages Effects

According to the present invention, a portable device for controlling a photography mode and controlling method therefor can be provided.

Additionally, according to the present invention, the portable device can detect a plurality of markers and configure a photography mode based on a distance from the portable device to the plurality of the markers.

Additionally, according to the present invention, when a plurality of markers are at substantially the same distance from the portable device, the portable device can execute a 2D photography mode for capturing a 2D image.

Additionally, according to the present invention, when a plurality of markers are at different distances from the portable device, the portable device can execute a 3D photography mode for capturing a 3D image.

Additionally, according to the present invention, the portable device can include a plurality of camera units and generate a 3D image using binocular parallax of the plurality of the camera units.

Additionally, according to the present invention, the portable device can configure a focused object based on a distance to a marker in a 3D image in which a plurality of 3D objects are included.

Additionally, according to the present invention, the portable device can generate a 3D image including a plurality of 3D objects with different depths.

Additionally, according to the present invention, if a distance to a marker is changed after execution of the 2D photography mode, the portable device can switch from the 2D photography mode to the 3D photography mode.

Additionally, according to the present invention, the portable device can return to the 2D photography mode in a state in which the 3D photography mode is executed.

DESCRIPTION OF DRAWINGS

FIG. 1 is a diagram illustrating a method by which a portable device detects markers and configures an image capturing area according to one embodiment of the present invention.

FIGS. 3a and 3b are diagrams illustrating a method by which the portable device captures a 3D image based on detected markers according to one embodiment of the present invention.

FIGS. 5a to 5f are diagrams illustrating a method by which the portable device controls focus of a captured image based on a marker according to one embodiment of the present invention.

FIGS. 7a and 7b are diagrams illustrating a method by which the portable device controls a depth of a 3D object based on positions of a plurality of markers according to one embodiment of the present invention.

FIGS. 8a and 8b are diagrams illustrating a method by which the portable device switches from a 2D photography mode to a 3D photography mode after executing the 2D photography mode according to one embodiment of the present invention.

FIG. 11 is a flowchart illustrating a controlling method for a portable device according to one embodiment of the present invention.

BEST MODE FOR INVENTION

Figure 2A:
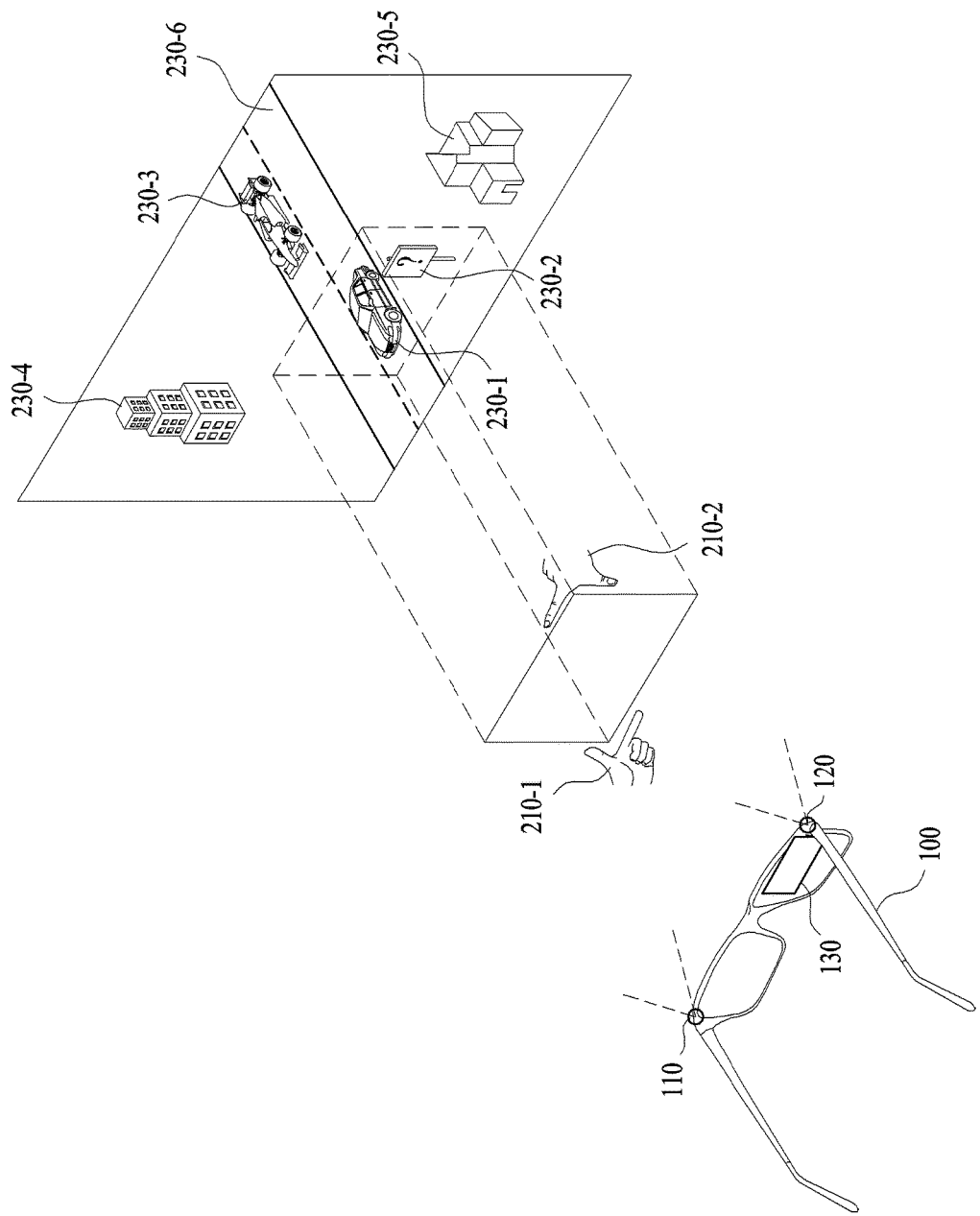
FIGS. 2a and 2b are diagrams illustrating a method by which the portable device captures a 2D image based on detected markers according to one embodiment of the present invention.

Hereinafter, the embodiments of the present invention will be described in detail with reference to the accompanying drawings and the details illustrated in the accompanying drawings but the scope of the present invention is not limited or restricted to the embodiments described herein.

Although the terms used in the present specification are selected, as much as possible, from general terms that are widely used at present while taking into consideration their functions, these terms may be replaced by other terms based on intentions of those skilled in the art, customs, emergence of new technologies, or the like. In addition, terms that are arbitrarily selected by the applicant may be used in a specific case. In this specific case, meanings of these terms will be disclosed in detail in the corresponding part of the description of the invention. Accordingly, the terms used herein should be defined based on practical meanings thereof and the whole content of this specification, rather than based on names of the terms.

In addition, although the terms such as "first" and/or "second" in the present specification may be used to describe various elements, the elements are not limited by such terms. Also, the terms may be used to identify one element from another element. For example, a first element may be referred to as a second element or vice versa without departing from the scope of the present invention.

In the entire specification, the term such as "include" or "comprise" should be interpreted as that other components may further be included, not excluded, unless otherwise specified. The term such as "unit", "module" or the like signifies at least one function or operation processing unit that can be implemented in hardware, software, or combination thereof.

FIG. 1 is a diagram illustrating a method by which a portable device detects markers and configures an image capturing area according to one embodiment of the present invention. In the present specification, a portable device 100 may means a device for capturing a 3D image or a device for displaying a captured 3D image. In an embodiment, the portable device 100 may mean a smart device (e.g., smart phone, smart pad, smart table, head-mounted display device, etc.) capable of a 3D image. Here, a 3D image means the image that allows a user to have stereoscopic depth perception. The portable device 100 can photograph the 3D image using binocular parallax of camera units. In detail, the portable device 100 may use a plurality of the camera units using the same method by which a human being feels a sense of perspective through binocular parallax due to the distance between two eyes (about 6.5 cm).

In this case, the portable device 100 can capture a stereoscopic image based on the binocular parallax by generating a left-eye image to be displayed on the left-eye and a right-eye image to be displayed on the right-eye. In addition, as one example, the portable device 100 may display a 3D image. In this case, a 3D image display method used in the portable device 100 is classified into a glasses method and a non-glasses method. Examples of the glasses method may include anaglyphic 3D, polarization 3D, and alternate-frame sequencing methods. Examples of the non-glasses method may include parallax barrier, lenticular lens, and holographic methods.

Referring to FIG. 1, the portable device 100 may be a wearable device. That is, the portable device 100 may be operated in a state in which the portable device 100 is worn by a user. In this case, the wearable device 100 may include a plurality of camera units 110 and 120. The wearable device 100 may detect markers 210-1 and 220-1 using the camera units 110 and 120 and then capture an image. In this case, an area to be included in the captured image may be determined by the markers 210-1 and 220-1. In detail, an area within the markers may be captured as an image. In other words, the wearable device 100 may detect the markers, set the area within the markers as the capturing area, and then capture a 2D image or a 3D image. A method for capturing a 2D image or a 3D image will be described later with reference to FIGS. 2 and 3. Further, the portable device 100 may be a smart device. That is, the portable device 100 may be one of a smart phone, a smart pad, a laptop, etc., which a user can use without wearing them. In this case, as described above, the portable device 100 may also detect the markers 210-1 and 220-2 and then capture an image.

Figure 2B:
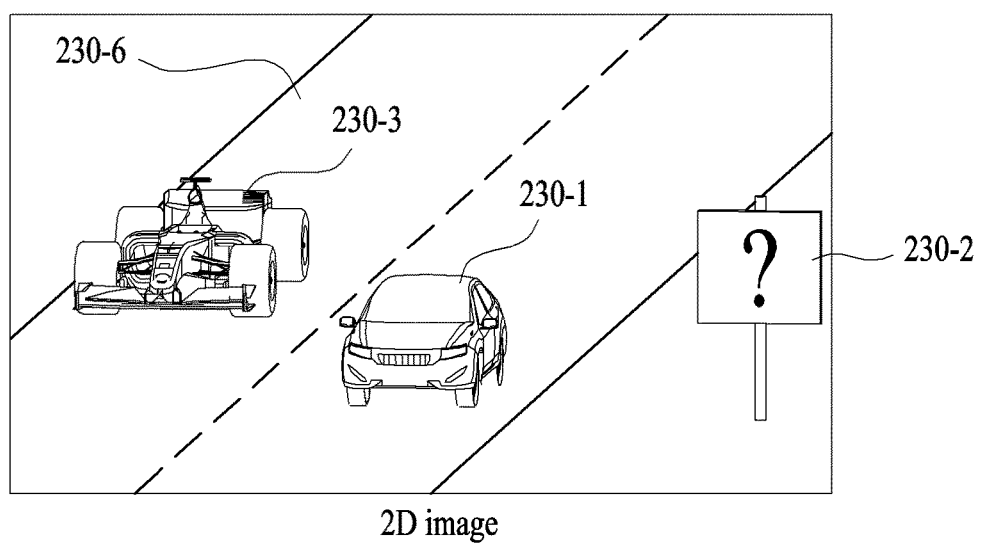

FIGS. 2a and 2b are diagrams illustrating a method by which the portable device captures a 2D image based on detected markers according to one embodiment of the present invention.

The portable device 100 can detect a first marker 210-1 located at a first distance from the portable device 100 and a second marker 210-2 located at a second distance from the portable device 100 by using at least one of a first camera unit 110 and a second camera unit 120. In this case, if the first distance to the detected first marker 210-1 is substantially equal to the second distance to the detected second marker 210-2, the portable device 100 may execute a 2D photography mode and then capture a 2D image. That is, when the first marker 210-1 and the second marker 210-2 are located at the same distance from the portable device 100, the portable device 100 may capture an area within the first marker 210-1 and the second marker 210-2 as a 2D image. In this case, if a difference between the first distance and the second distance is smaller than a threshold distance, the portable device 100 may determine that the first distance and the second distance are substantially equal to each other. In other words, if the two distances are within a margin of error, the portable device 100 may determine that the two distances are equal to each other and then execute the 2D photography mode.

In this case, the 2D photography mode may be a mode for capturing a 2D image as described above. In addition, as one example, when executing the 2D photography mode, the portable device 100 may display a photography guide frame using a display unit 130. In detail, the portable device 100 may configure the photography guide frame based on positions at which the first marker 210-1 and the second marker 210-2 are detected. The portable device 100 may display an image capturing area corresponding to the area within the first marker 210-1 and the second marker 210-2 through the photography guide frame. In this case, if the 2D photography mode is currently executed, the portable device 100 may capture the area within the photography guide frame as a 2D image. Moreover, as another example, the portable device 100 may display the photography guide frame as a 2D image while executing the 2D photography mode. That is, the photography guide frame may be displayed in two-dimension. As a further example, the portable device 100 may display the photography guide frame as a 3D image in a 3D photography mode. In this case, the photography guide frame may correspond to an image for representing a depth of the 3D image based on regular volume. Details will be described later with reference to FIGS. 3a and 3b.

In addition, the portable device 100 may further display a photography mode indicator using the display unit 130 and in this case, the photography mode indicator may be an indicator for indicating a configured photography mode. That is, in the case of the 2D photography mode, the portable device 100 may display an indicator for indicating the 2D photography mode. In the case of the 3D photography mode, the portable device 100 may display an indicator for indicating the 3D photography mode.

For example, referring to FIGS. 2a and 2b, the first marker 210-1 and the second marker 210-2 may be user's hands. In this case, the portable device 100 may capture an area within the user's hands 210-1 and 210-2 as a 2D image and the 2D image may be an image configured based on the distances to the detected first marker 210-1 and second marker 210-2. In detail, the 2D image may be obtained by capturing a first object 230-1, a second object 230-2, a third object 230-3, and a background image 230-6 with reference to the distances to the first marker 210-1 and second marker 210-2 from the portable device 100. In other words, the first object 230-1, the second object 230-2, the third object 230-3 and the background image 230-6 may be captured at the same depth.

Figure 3B:
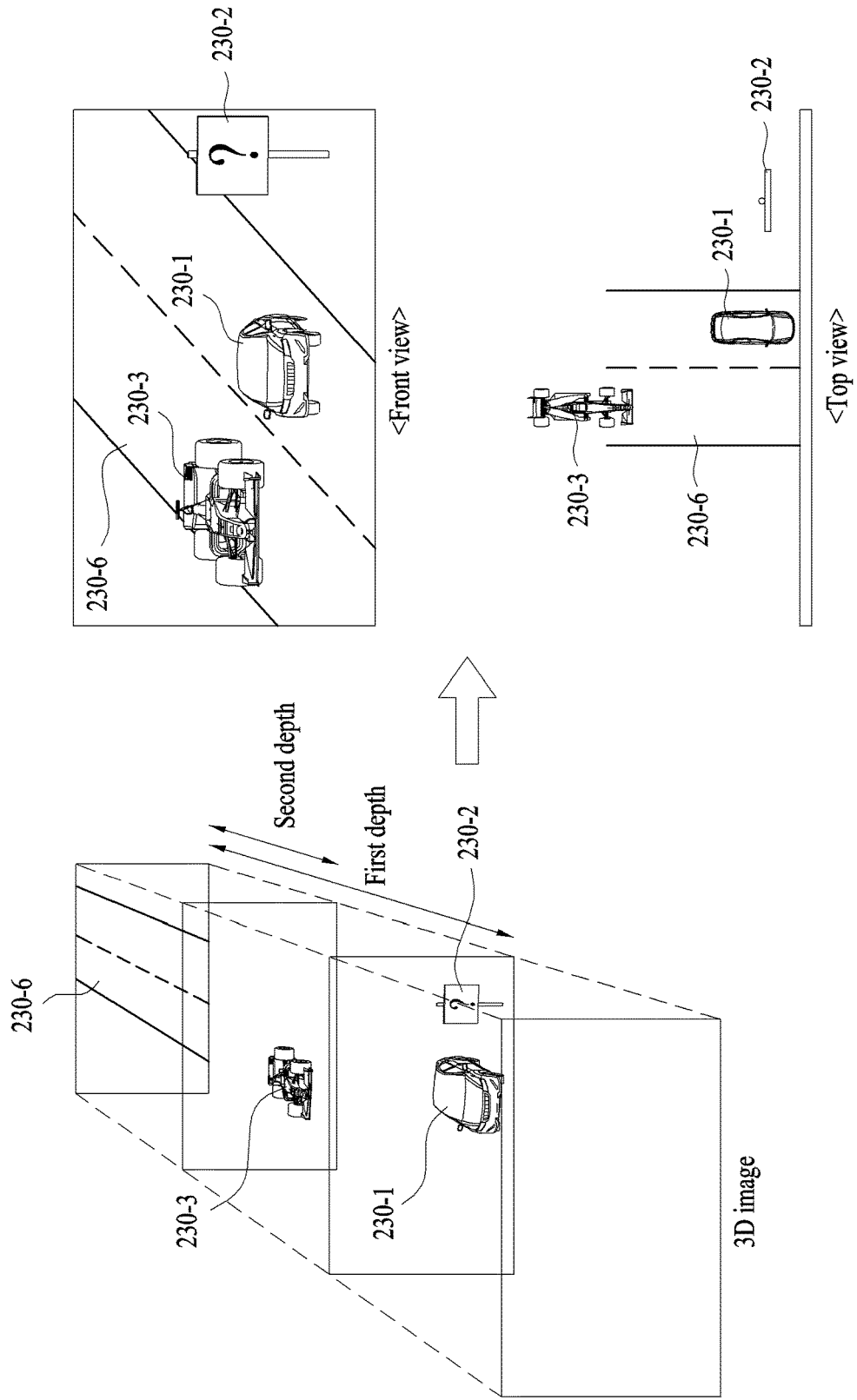

FIGS. 3a and 3b are diagrams illustrating a method by which the portable device captures a 3D image based on detected markers according to one embodiment of the present invention.

If the first distance to the first marker 210-1 is different from the second distance to the second marker 210-2, the portable device 100 can execute the 3D photography mode. In this case, the 3D photography mode may be a mode for capturing a 3D image. In detail, if a difference between the first distance and the second distance is greater than a threshold, the portable device 100 may determine that the first distance and the second distance are different from each other. In this case, the portable device 100 may capture a 3D image using the first camera unit 110 and the second camera unit 120. As described above, the first camera unit 110 and the second camera unit 120 may be installed at different positions of the portable device. That is, the first camera unit 110 and the second camera unit 120 are located apart from each other by a predetermined distance. The portable device 100 may generate a 3D image based on binocular parallax of the first and second camera units 110 and 120. In this case, similar to the distance between two eyes of a human being, the binocular parallax may mean a distance between the first camera unit 110 and the second camera unit 120. Through the binocular parallax, the portable device 100 can generate a 3D image with a stereoscopic depth. In this case, for example, the portable device 100 may generate a 3D image based on a distance difference between the first distance to the first marker 210-1 and the second distance to the second marker 210-2. If the distance difference between the first distance and the second distance is increased, the portable device 100 may generate a 3D image with a greater stereoscopic depth. Moreover, for example, referring to FIGS. 3a and 3b, the portable device 100 may also display the photography guide frame in the 3D photography mode.

In this case, the photography guide frame may correspond to an area to be captured as a 3D image. In addition, the portable device 100 may display the photography guide frame as a 3D augmented reality image. In this case, the photography guide frame may correspond to an image for representing a depth of the 3D image based on regular volume. For example, the photography guide frame may be a preview image for the image that will be captured as a 3D image. That is, the portable device 100 may provide a user with the captured 3D image based on a depth. In addition, for example, the portable device 100 may display a first photography guide frame 310-1 and a second photography guide frame 310-2 based on the first distance and the second distance. In this case, the first photography guide frame 310-1 may be displayed based on the first distance to the first marker and the second photography guide frame 310-2 may be displayed based on the second distance to the second marker. Through the first and second photography guide frames, the portable device 100 may provide the user with information on the first and second distances.

In one embodiment, as shown in FIGS. 3a and 3b, the portable device 100 can detect the user's hands as the first marker 210-1 and the second marker 210-2. In this case, the first distance to the first marker 210-1 may be different from the second distance to the second marker 210-2. Both of the first and second distances may be measured from the front side of the portable device 100. That is, each of the first and second distances may mean a distance measured from the front side of the portable device 100. In this case, the portable device 100 may generate a 3D image containing all of the first object 230-1, the second object 230-2, the third object 230-3, and the background image 230-6. In addition, the portable device 100 may set different depths for the respective objects based on the first distance and the second distance and such depths may be set with reference to the display unit 130. In detail, the portable device 100 may display a 3D object with a depth protruded towards the front side of the display unit 130. As another example, the portable device 100 may also display a 3D object with a depth dented from the display unit towards the rear side of the display unit 130 based on positive binocular parallax. Hereinafter, a depth protruded towards the front side of the display unit 130 is referred to as (+) depth, a depth dented towards the rear side of the display unit 130 is referred to as (−) depth, and a surface depth of the display unit 130 is referred to as (0) depth.

The portable device 100 can set different depths for the first object 230-1, the second object 230-2, the third object 230-3, and the background image 230-6. In this case, the first object 230-1, the second object 230-2, the third object 230-3, and the background image 230-6 may be generated as images corresponding to real objects. For example, when the portable device 100 detects that the first distance is different from the second distance, the portable device 100 may generate a triggering signal for creating a 3D image and set a depth of an object. Thereafter, the portable device 100 may create the 3D image. In this case, for example, the portable device 100 may set the first object 230-1 and the second object 230-2 to have a first depth. In addition, the portable device 100 may set the third object 230-3 to have a second depth. Moreover, the portable device 100 may set the background image 230-6 to have the (0) depth. Here, the firs depth and the second depth may be the (+) depth protruded towards the front side of the display unit 130. Through the above process, the portable device 100 may provide the 3D image allowing the user to have the stereoscopic depth perception. Further, for example, the portable device 100 may set a depth difference between the first depth and the second depth based on the aforementioned difference between the first distance and the second distance. Specifically, when the difference between the first distance and the second distance is large, the portable device 100 may increase the depth difference between the first depth and the second depth. That is, the portable device 100 may detect the distance difference between the first distance and the second distance as a triggering operation and then adjust the stereoscopic depth of the 3D image through the detected distance difference.

FIGS. 4a to 4e are diagrams illustrating a method by which the portable device generates a 3D image using a 2D image according to one embodiment of the present invention.

As described above, the portable device 100 can create a 3D image based on the first and second distances. In this case, for example, the portable device 100 may capture a first 2D image 410-1 based on the first distance to the detected first marker 210-1 and a second 2D image 410-2 based on the second distance to the detected second marker 210-2 in order to generate the 3D image. Here, the first 2D image 410-1 may be an image captured with respect to the first distance and the second 2D image 410-2 may be an image captured with respect to the second distance. For instance, referring to FIGS. 4a to 4d, the portable device 100 may set the area within the first marker 210-1 and the second marker 210-2 as the capturing area. In this case, if the first marker 210-1 and the second marker 210-2 are at the same distance, the area within the first marker 210-1 and the second marker 210-2 may be configured in the same manner. The portable device 100 may capture the first 2D image 410-1 based on the first distance to the first marker 210-1 and the second 2D image 410-2 based on the second distance to the second marker 210-2. That is, the first 2D image 410-1 and the second 2D image 410-2 may have the same size. In other words, the portable device 100 may capture the first 2D image 410-1 and the second 2D image 410-2 based on a size determined by the area within the first marker 210-1 and the second marker 210-2.

Figure 4A:
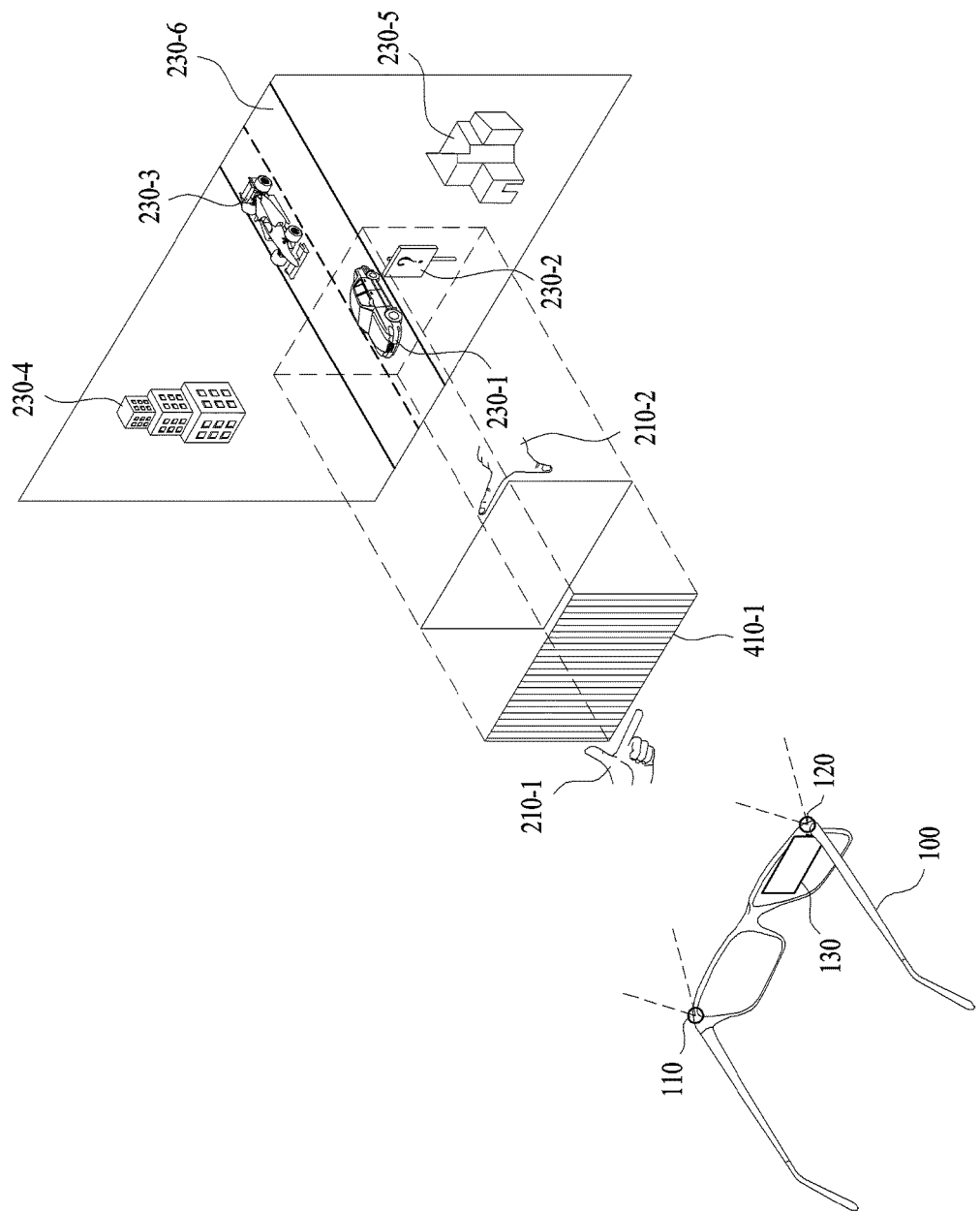
FIGS. 4a to 4e are diagrams illustrating a method by which the portable device generates a 3D image using a 2D image according to one embodiment of the present invention.
Figure 4B:
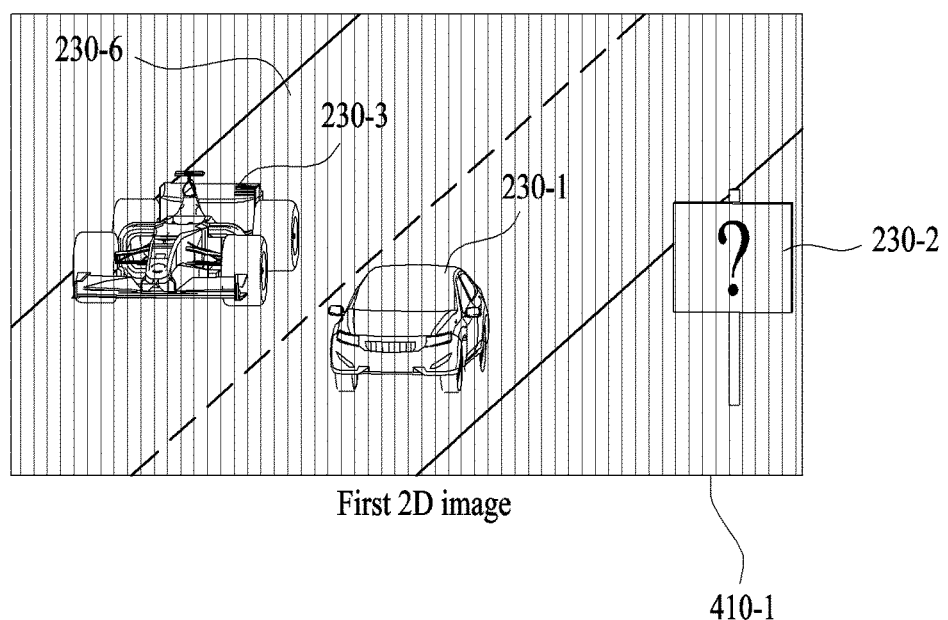
Figure 4C:
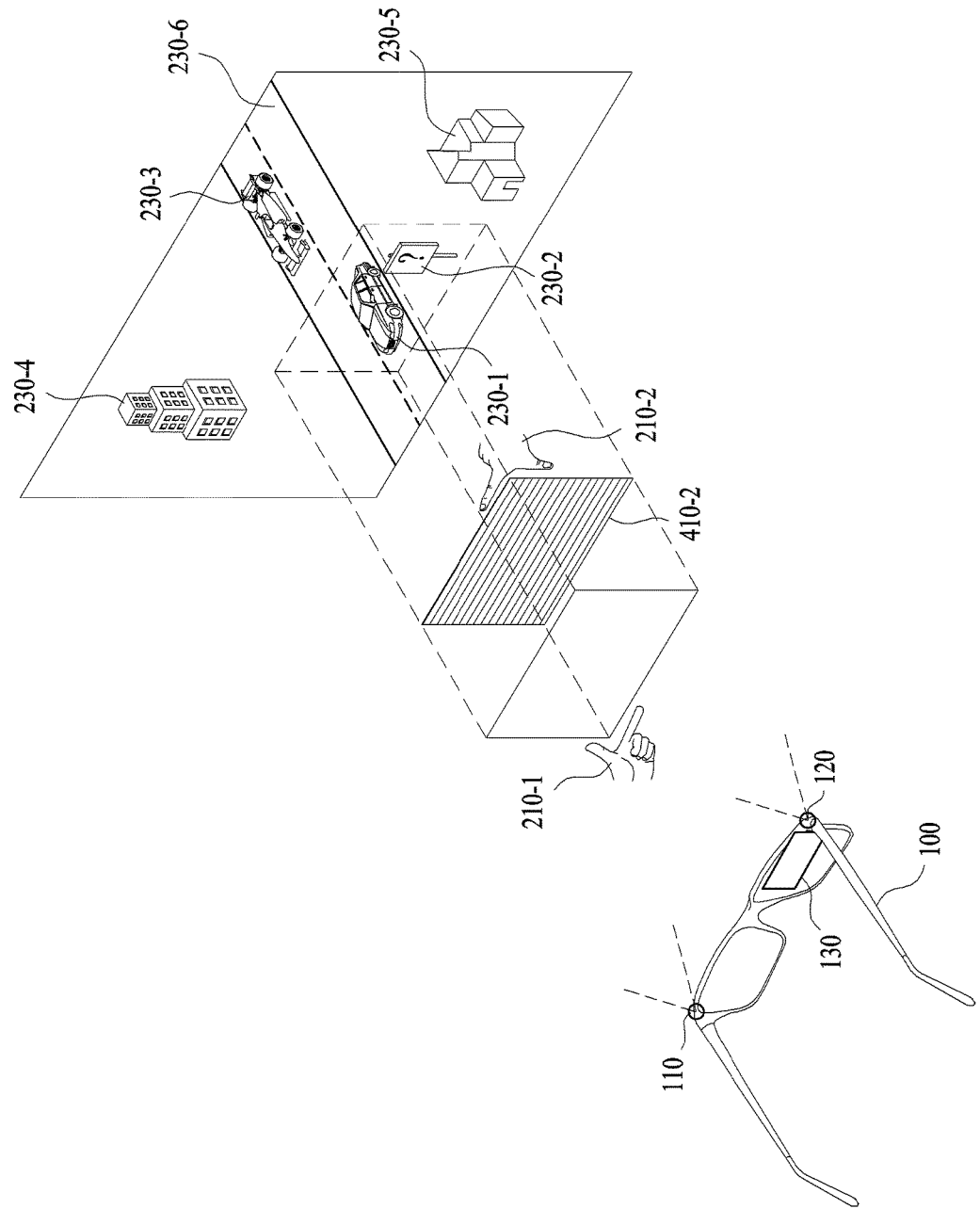
Figure 4D:
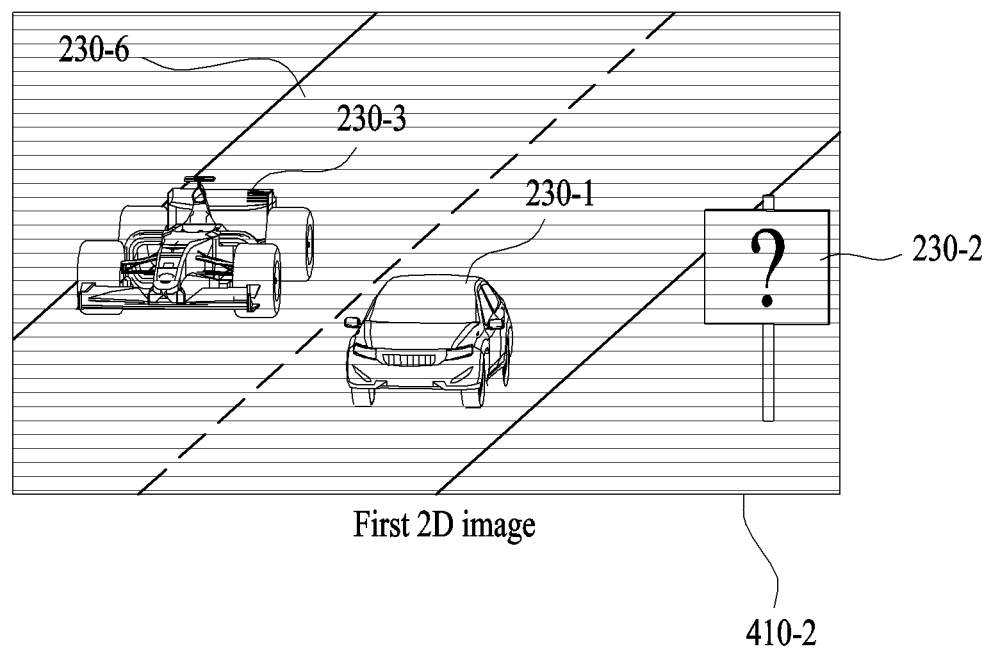
Figure 4E:
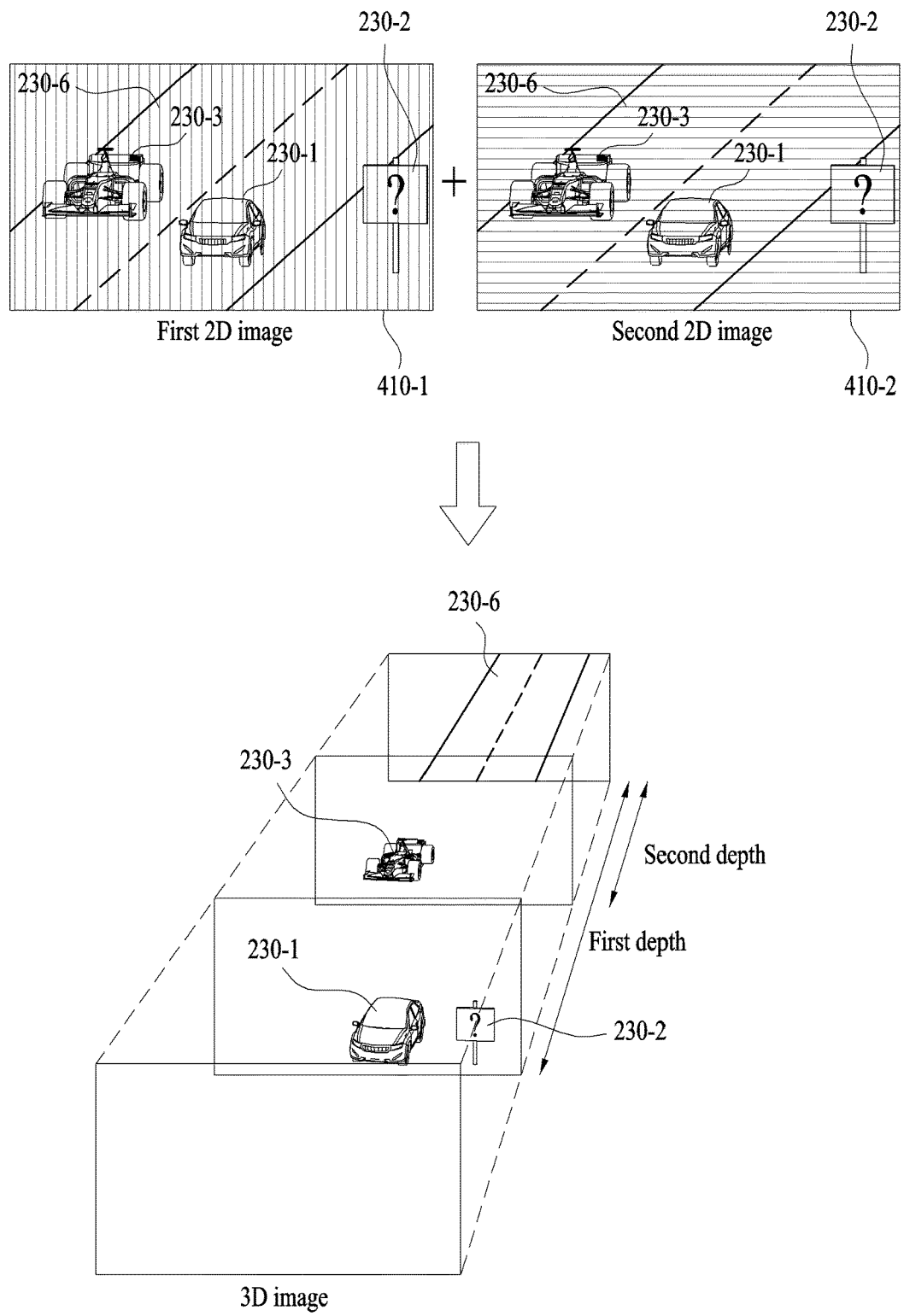

Referring to FIG. 4e, the portable device 100 may generate a 3D image using the first 2D image 410-1 and the second 2D image 410-2. In detail, since the first 2D image 410-1 may be the image captured based on the first distance and the second 2D image 410-2 may be the image captured based on the second distance, an area captured by the first 2D image 410-1 may be equal to an area captured by the second 2D image 410-2. However, due to the distance difference between the first distance and the second distance, objects contained in one image may have sizes and positions different from those contained in the other image. That is, the portable device 100 may create the 3D image using such a distance difference.

As another example, the portable device 100 can generate a 3D image by capturing an image based on a position difference between the first camera unit 110 and the second camera unit 120. In detail, the portable device 100 may capture a first 2D image using the first camera unit 110 and a second 2D image using the second camera unit 120. In this case, the first 2D image and the second 2D image may capture the same area. However, due to a distance difference between the first camera unit 110 and the second camera unit 120, objects contained in one image may have sizes and positions different from those contained in the other image. That is, the portable device 100 may create the 3D image using such a distance difference between the camera units 110 and 120. Further, the portable device 100 may use other methods not mentioned in the present invention to generate a 3D image and the invention is not limited to the above-described embodiments. In other words, although the present invention describes that the portable device 100 configures a photography mode using the first marker 210-1 and the second marker 210-2 and then creates a triggering signal by detecting operations performed by the first marker 210-1 and the second marker 210-2 during the procedure for creating the above-mentioned 3D image, the invention is not limited to the 3D image generation method.

FIGS. 5a to 5f are diagrams illustrating a method by which the portable device controls focus of a captured image based on a marker according to one embodiment of the present invention.

The portable device 100 can adjust a focus of the image captured based on the detected markers. In detail, the portable device may set a focus point on a specific object in a 3D image and then capture an image. In this case, the focus point means the point at which light is focused and it may be determined according to optical properties of a lens or a mirror. Moreover, the focus point may also mean the point at which an image of a subject is formed such a manner that light rays reflected from the subject are focused at a focal plane after the light rays go through a lens. For instance, the portable device 100 may capture an out-focused 3D image where a specific object is clearly captured whereas the remaining area is blurred. However, the present invention is not limited thereto.

Figure 5A:
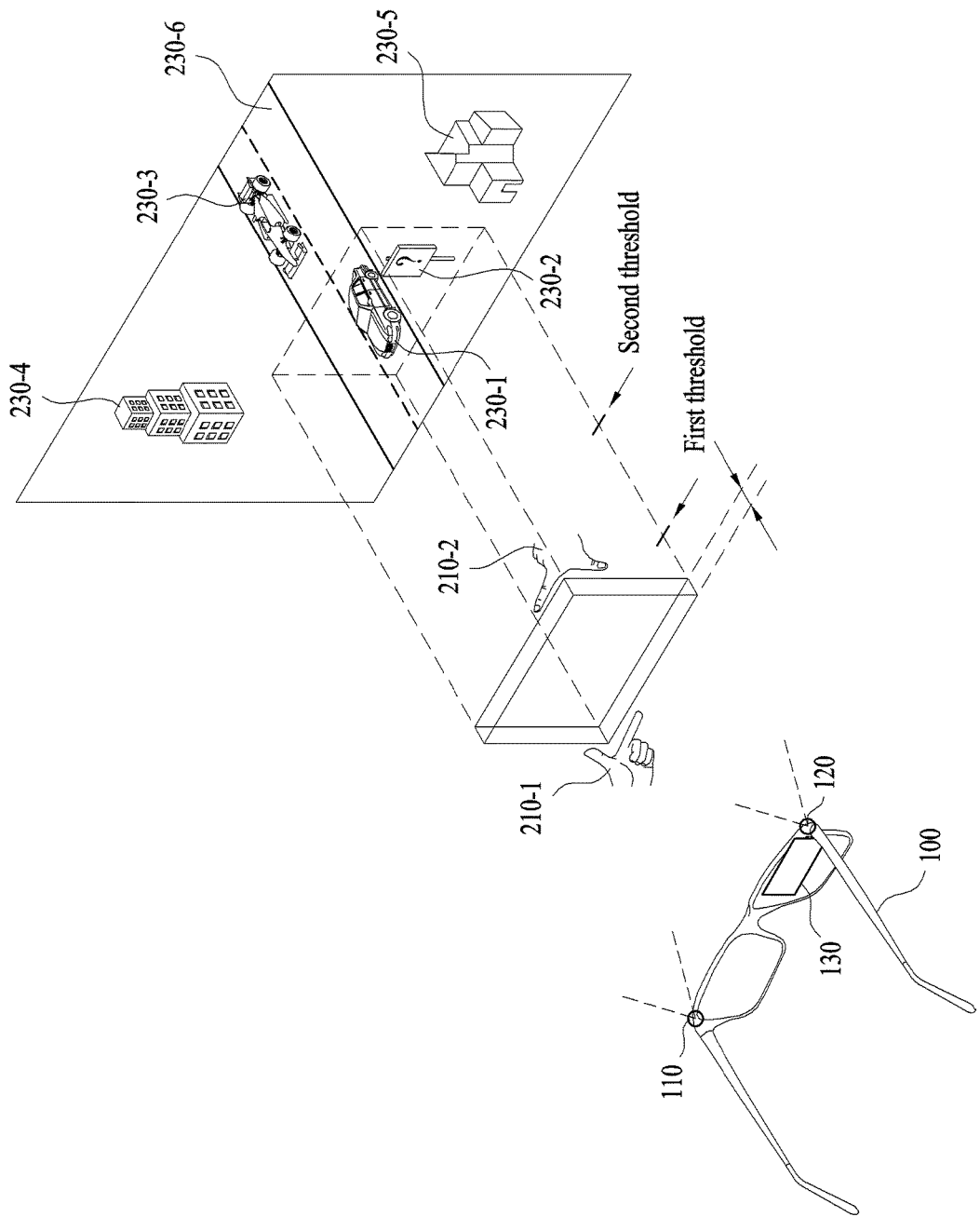
Figure 5B:
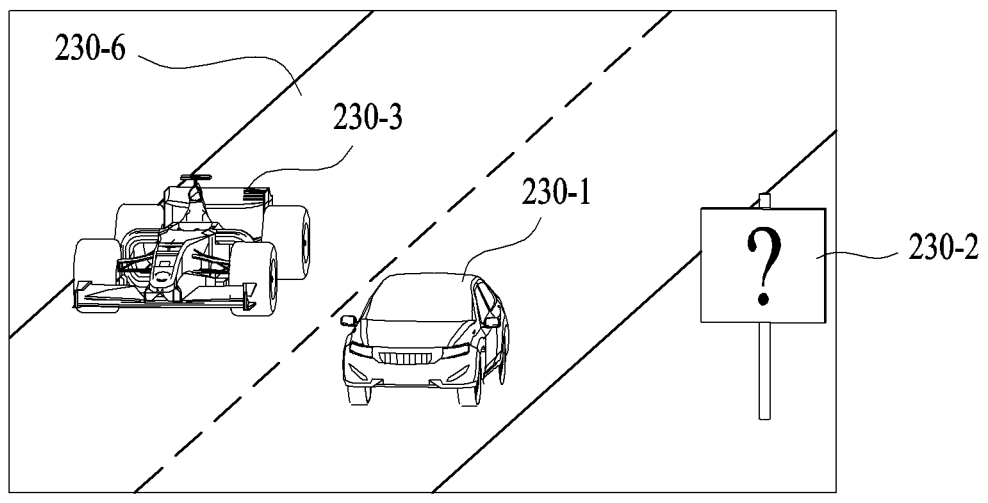
Figure 5C:
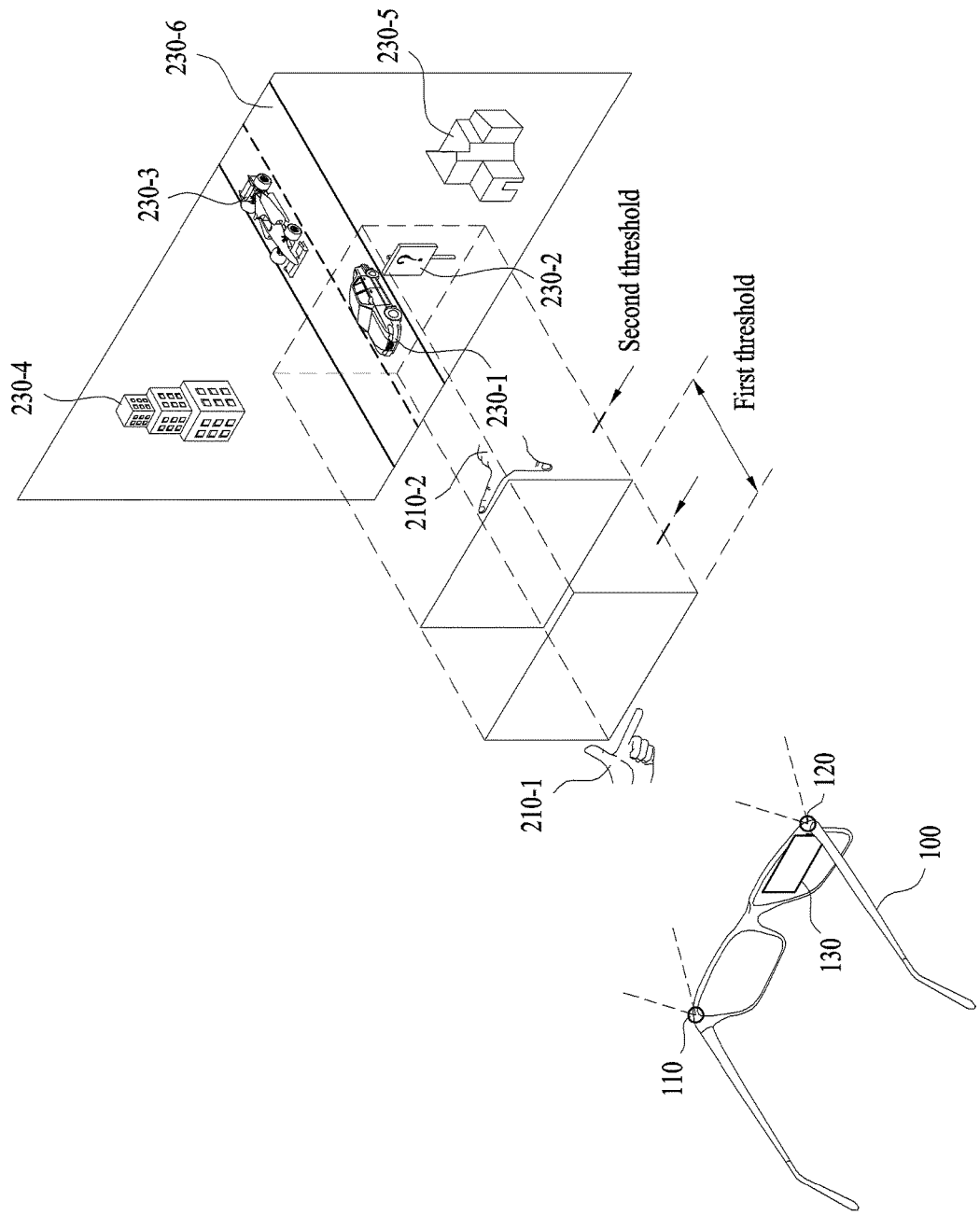
Figure 5D:
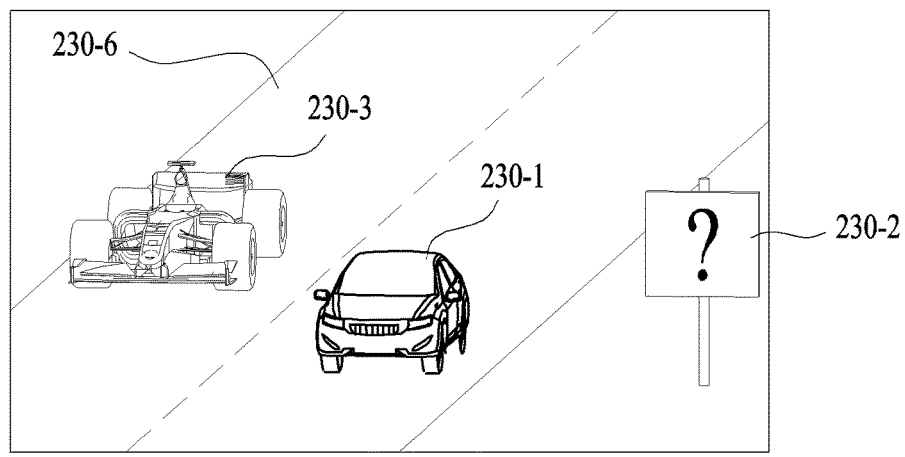

More specifically, the portable device 100 can determine an object to be focused based on the first distance to the first marker 210-1 and the second distance to the second marker 210-2. Referring to FIGS. 5a and 5b, for example, if the distance difference between the first distance and the second distance is smaller than a first threshold distance, the portable device 100 may execute the 2D photography mode and then capture a 2D image. That is, as described above, when the first distance is substantially equal to the second distance, the portable device 100 may execute the 2D photography mode. In addition, referring to FIGS. 5c and 5d, if the distance difference between the first distance and the second distance is greater than the first threshold distance less than a second threshold distance, the portable device 100 may capture a 3D image by focusing on the first object 230-1. In this case, for instance, the first object may correspond to an image with the highest depth. In other words, the portable device 100 may capture the 3D image by focusing on the most protruded object on display unit 130.

Figure 5F:
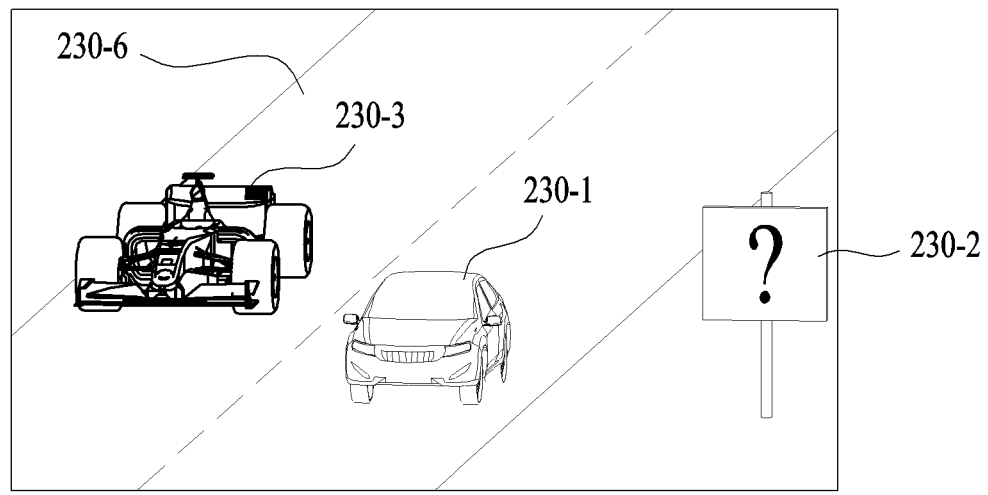

Moreover, referring to FIGS. 5e and 5f, for example, if the difference between the first distance and the second distance is greater than the second threshold distance, the portable device 100 may capture a 3D image by focusing on the third object 230-3. In this case, for instance, the third object 230-3 may correspond to an image with the lowest depth. That is, the portable device 100 may capture the 3D image by focusing on the most dented object. In this case, although the focused object may be changed by a user or a processor 150, the invention is not limited thereto. Further, the first threshold and the second threshold may have a certain margin of error and both of them may be changed by the user or the processor 150.

Figure 6A:
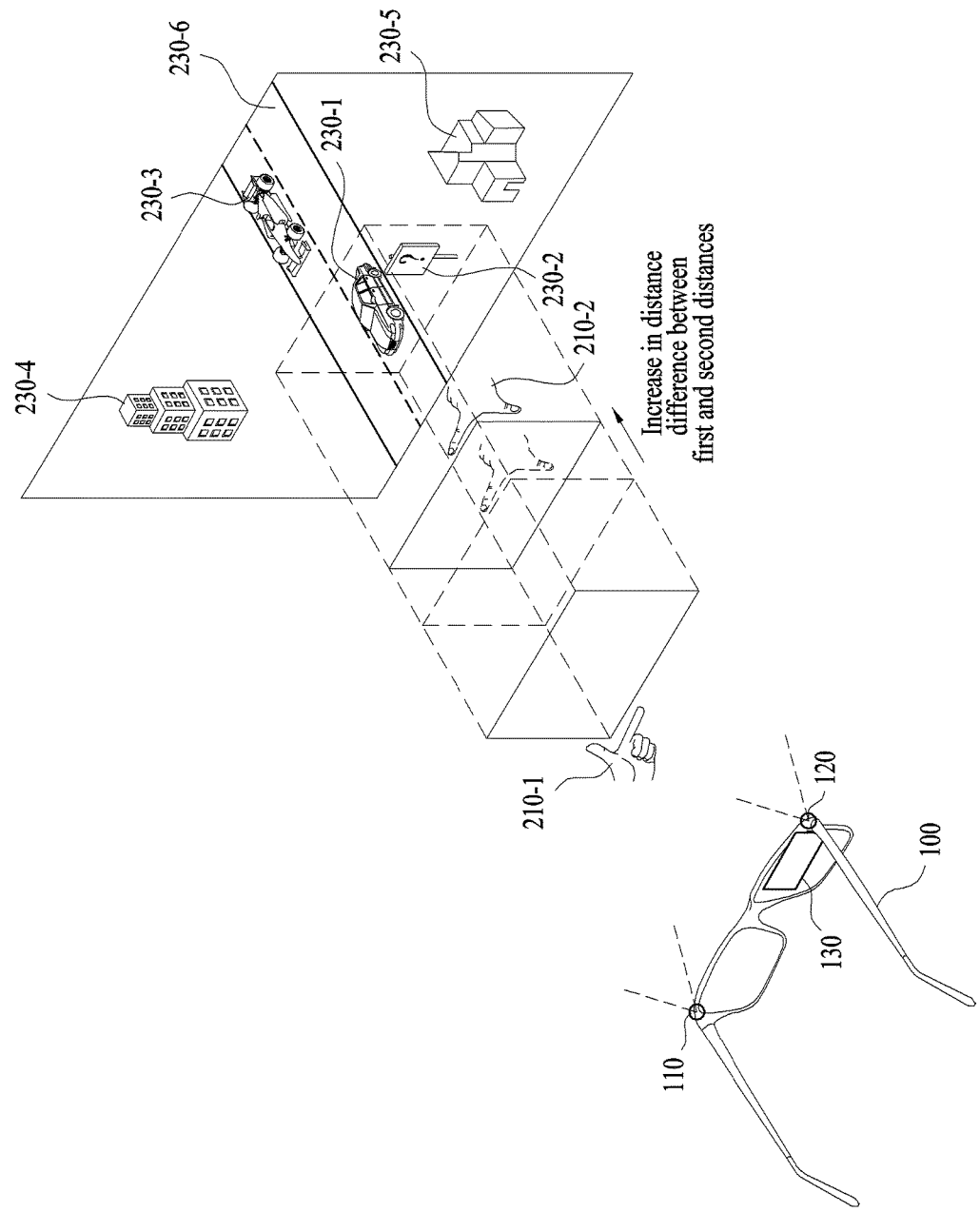
FIGS. 6a and 6b are diagrams illustrating a method by which the portable device controls a depth of a 3D object based on distances between a plurality of markers according to one embodiment of the present invention.
Figure 6B:
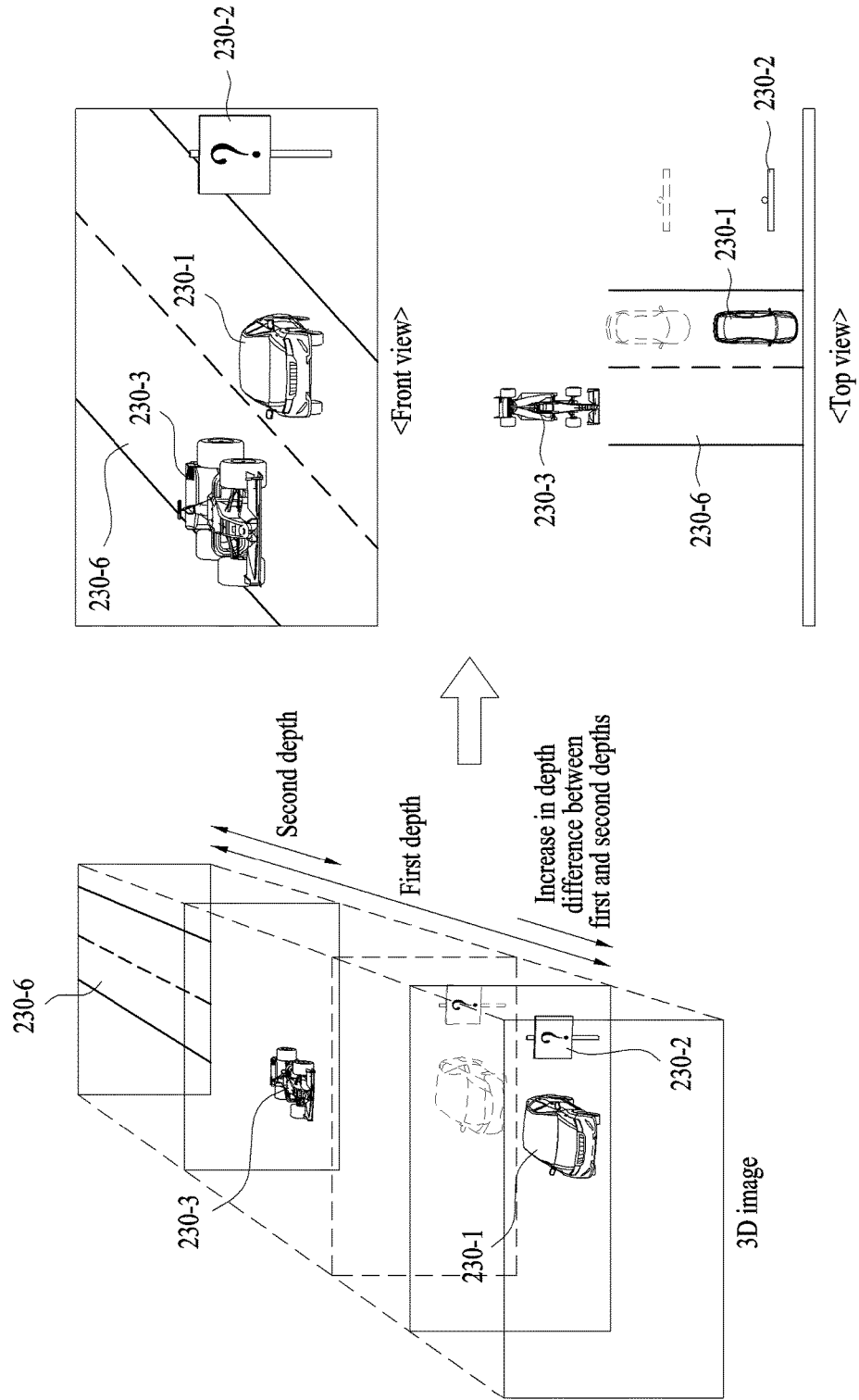

FIGS. 6a and 6b are diagrams illustrating a method by which the portable device controls a depth of a 3D object based on distances between a plurality of markers according to one embodiment of the present invention.

As described above, the portable device 100 can set different depths for individual 3D objects included in a 3D image. In this case, the portable device 100 may adjust the depths of the 3D objects based on the first distance to the first marker 210-1 and the second distance to the second marker 210-2. In detail, referring to FIGS. 6a and 6b, as the distance difference between the first distance and the second distance increases, the portable device 100 may increase a depth difference between the first depth and the second depth. That is, the portable device 100 may adjust the stereoscopic depth of the 3D image based on the distance difference between the first distance and the second distance. The distance between the first distance and the second distance may trigger an operation of adjusting the depth difference. Specifically, when the difference between the first distance and the second distance increases, the portable device may increase the first depth of the first object 230-1. In other words, the first object 230-1 may be displayed such that it is more protruded from the display unit 130.

As another example, the portable device 100 may display the photography guide frame for a 3D image. In this case, the photography guide frame may be displayed as an augmented reality image. When the difference between the first distance and the second distance increases, the portable device 100 may increase a depth difference between 3D objects using the photography guide frame and then display a preview image.

Figure 7B:
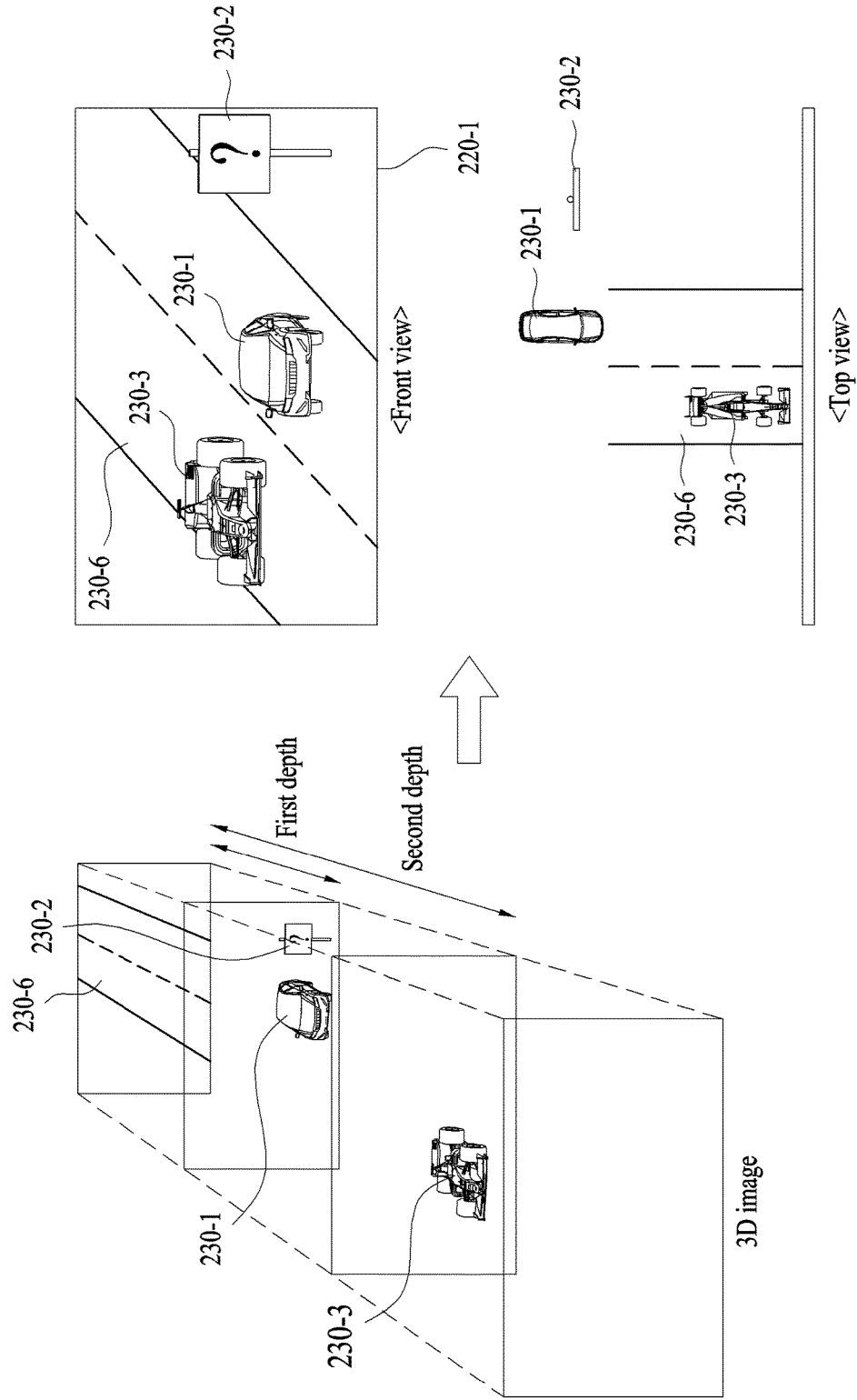

FIGS. 7a and 7b are diagrams illustrating a method by which the portable device controls a depth of a 3D object based on positions of a plurality of markers according to one embodiment of the present invention.

The portable device 100 can configure a photography mode based on a distance to a detected marker. In this case, for example, the first distance to the first marker 210-1 may be greater than the second distance to the second marker 210-2. That is, compared to the second marker 210-2, the first marker 210-1 may be detected at a point located far away from the portable device 100. For example, the portable device 100 may set depths of the first object 230-1 and the third object 230-3 in a 3D image to the first depth and the second depth, respectively. In this case, if the first distance to the first marker 210-1 is smaller than the second distance to the second marker 210-2, the portable device 100 may set the first depth to be greater than the second depth. In other words, the portable device 100 may display the first object 230-1 in the 3D image to be more protruded from the display unit 130.

On the contrary, if the first distance to the first marker 210-1 is greater than the second distance to the second marker 210-2, the portable device 100 may set the first depth to be smaller than the second depth. In other words, the portable device 100 may display the third object 230-3 in the 3D image to be more protruded from the display unit 130. In this case, for example, the portable device 100 may detect an operation of adjusting the first and second distances as a triggering operation to determine the depths of the objects. That is, the portable device 100 may set configurations of the first and second depths based on the detected triggering operation.

Specifically, referring to FIGS. 7a and 7b, the first distance to the first marker 210-1 may be greater than the second distance to the second marker 210-2. In this case, the portable device 100 may set the first depth of the first object 230-1 to be smaller than the second depth of the third object 230-3. That is, the portable device 100 may control the 3D image created by a gesture of the user's hands. In addition, for example, the portable device 100 may display a preview image for the created 3D image through the photography guide frame. Details are described to avoid redundancy.

FIGS. 8a and 8b are diagrams illustrating a method by which the portable device switches from a 2D photography mode to a 3D photography mode after executing the 2D photography mode according to one embodiment of the present invention.

After executing the 2D photography mode, the portable device 100 can switch from the 2D photography mode to the 2D photography mode. In detail, the portable device 100 may execute the 2D photography mode when intending to execute a photography mode for capturing an image. In this case, the portable device 100 may detect the first marker 210-1 and the second marker 210-2 using at least one of the first camera unit 110 and the second camera unit 120. If the first distance to the first marker 210-1 is substantially equal to the second distance to the second marker 210-2, the portable device may execute the 2D photography mode based on the detected first and second markers. Here, the substantially same distance may mean that the distance difference between the first distance and the second distance is smaller than the threshold distance as described above. In other words, if the first distance and the second distance, which are measured toward the front of the portable device 100, are the same within a margin of error, the portable device 100 may consider that the two distances are substantially the same. In this case, for example, if the first distance and the second distance are not substantially the same, the portable device may not execute a photography mode. In particular, when intending to execute a photography mode, the portable device 100 may preferentially execute the 2D photography mode.

While executing the 2D photography mode, the portable device 100 can detect that the first distance to the first marker 210-1 and the second distance to the second marker 210-2 are changed. In this case, as one example, the portable device 100 may detect the changes in the first and second distances using at least one of the first camera unit 110 and the second camera unit 120. As another example, the portable device 100 may detect the changes in the first and second distances using a sensor unit 140. Details will be described later with reference to FIG. 9.

When detecting that the distance difference between the first distance to the first marker 210-1 and the second distance to the second marker 210-2 exceeds the threshold distance, the portable device 100 can switch the photography mode from the 2D photography mode to the 3D photography mode. Here, the threshold distance corresponds to a value for determining whether to switch from the 2D photography mode to the 3D photography mode and it may have a certain margin of error. Moreover, the above threshold distance may be configured by the user or the processor. That is, the portable device 100 may switch from the 2D photography mode to the 3D photography mode based on the distance difference between the first and second distances. However, the invention is not limited thereto. Further, after switching from the 2D photography mode to the 3D photography mode, the portable device 100 may further detect that the distance difference between the first distance to the first marker 210-1 and the second distance to the second marker 210-2 is changed. In this case, for instance, if the distance difference between the first distance and the second distance increases, the portable device 100 may adjust a depth of a 3D image. Specifically, referring to FIG. 8*a*, the 3D image may contain a first 3D object 230-1, a second 3D object 230-2, a third 3D object 230-3, and a background image 230-6. In this case, as mentioned in the foregoing description, the first 3D object 230-1 may have the first depth and the second 3D object 230-3 may also have the first depth. In addition, the third 3D object 230-3 may have the second depth and the background image may have the (0) depth, which means that it is not protruded from the display unit 130. In this case, if the distance difference between the first distance and the second distance increases, the portable device 100 may increase a depth difference between the first depth of the first 3D object 230-1 and the second depth of the second 3D object 230-2. In other words, the portable device 100 may adjust the depth of the 3D image using the distance difference between the first distance and the second distance as a triggering operation. For example, a reference distance for adjusting the depth of the 3D image may correspond to the threshold distance. In detail, when the distance difference between the first distance and the second distance amounts to the threshold distance, the portable device 100 may set the first depth and the second depth to be the same. Thereafter, if the distance difference between the first distance and the second distance exceeds the threshold distance, the portable device may adjust the depth difference between the first depth and the second depth by considering the amount of increase in the distance difference.

In addition, for example, while executing the 3D photography mode, the portable device 100 may detect that the first distance and the second distance are changed. In this case, if the distance difference between the first distance and the second distance is smaller than the threshold distance, the portable device 100 may switch from the 3D photography mode to the 2D photography mode again. In other words, the portable device 100 may return to the 2D photography mode from the 3D photography mode. As described above, the portable device 100 may change its photography mode based on the distances to the markers 210-1 and 210-2 from the portable device 100.

Moreover, for example, referring to FIG. 8*b*, the portable device 100 may display the photography guide frame using the display unit 130. As another example, the portable device 100 may display the preview image using the display unit 130. That is, the portable device 100 may display an image to be captured using the display unit 130 before capturing the image. In this case, if the 2D photography mode is switched to the 3D photography mode, the portable device 100 may also change the preview image. In detail, the portable device 100 may display a 2D preview image while executing the 2D photography mode. However, if the 2D photography mode is switched to the 3D photography mode, the portable device 100 may also display a 3D preview image.

Further, if the depth of the 3D image is changed due to the increased difference between the first distance and the second distance, the portable device 100 may display a depth difference on the above-mentioned 3D preview image. By doing so, the portable device 100 may inform the user of the depth difference.

Figure 9:
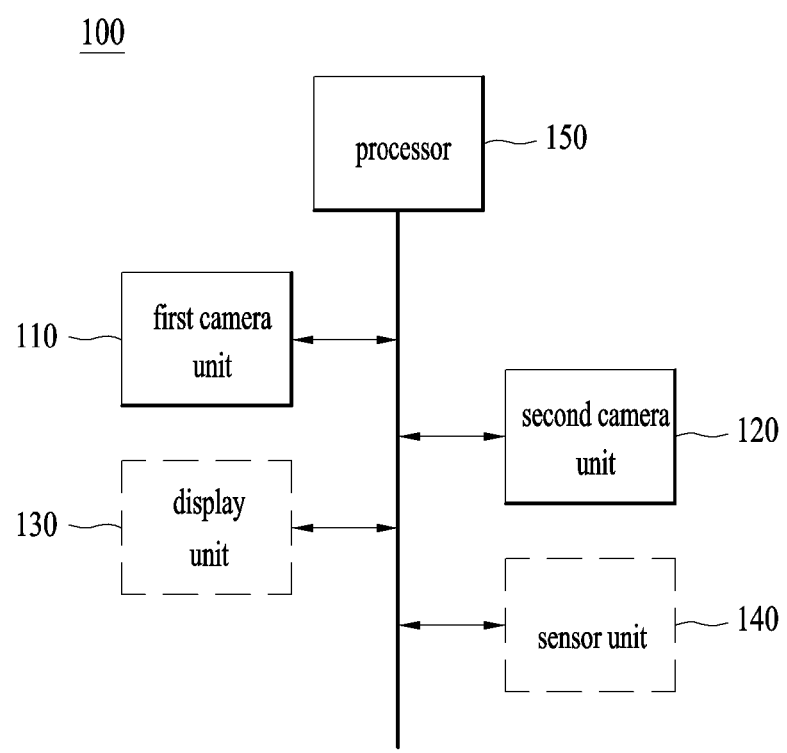
FIG. 9 is a block diagram of the portable device according to one embodiment of the present invention.

FIG. 9 is a block diagram of the portable device according to one embodiment of the present invention.

The portable device 100 may include the first camera unit 110, the second camera unit 120, and the processor 150. Moreover, the portable device 100 may further include the display unit 130 as an optional configuration. Further, the portable device 100 may further include the sensor unit 140 as an optional configuration. The above-described units may be implemented as hardware such that they are combined with each other in the portable device 100. For instance, the above units may transmit and receive commands with each other for their mutual operation by using electrical signals in the portable device 100. That is, the above-mentioned units may interact with each other through a coordinated combination thereof.

The portable device 100 may include the first camera unit 110 and the second camera unit 120, and capture a 3D image using the first camera unit 110 and the second camera unit 120. The first camera unit 110 may generate a left-eye image and the second camera unit 120 may generate a right-eye image. In this case, the portable device 100 may generate the 3D image using the left-eye image and the right-eye image. In detail, the left-eye image and the right-eye image may generate binocular parallax. In this case, the portable device 100 may generate the 3D image with a stereoscopic depth by synchronizing the left-eye image and the right-eye image. In other words, the portable device 100 may create the 3D image using the binocular parallax, which is obtained from the first camera unit 110 and the second camera unit 120. Moreover, the portable device 100 may adjust a depth of a 3D object contained in the created 3D image as described above with reference to FIGS. 3a and 3b.

In addition, for example, the portable device 100 can change positions at which the first camera unit 110 and the second camera unit 120 are installed. In detail, similar to the human's eyes, the first camera unit 110 and the second camera unit 120 may be disposed in the horizontal direction. Moreover, the first camera unit 110 and the second camera unit 120 may be disposed in the vertical direction by being apart from each other by a prescribed distance. Through the above structures, the portable device 100 may adjust the binocular parallax of the first camera unit 110 and the second camera unit 120, and the depth of the 3D image.

Moreover, for example, the first camera unit 110 and the second camera unit 120 can be integrated as a single unit. Specifically, the first camera unit 110 and the second camera unit 120 may be controlled by a single camera hub. Such a camera hub may include two or more lenses and capture an image with binocular parallax.

Furthermore, for example, the first camera unit 110 and the second camera unit 120 can capture a 2D image. In this case, the portable device 100 may capture the image using at least one of the first camera unit 110 and the second camera unit 120. That is, when the portable device 100 intends to capture a 2D image, the portable device 100 may select and use a camera unit suitable for the 2D image in order to capture the 2D image. However, the invention is not limited thereto.

Further, the portable device 100 can detect the first marker at the first distance from the portable device and the second marker at the second distance from the portable device using at least one of the first camera unit 110 and the second camera unit 120. That is, the portable device 100 may detect the distances to the markers from the portable device using the first camera unit 110 and the second camera unit 120. For example, each of the first camera unit 110 and the second camera unit 120 may include at least one of an infrared sensor, an ultrasonic sensor, a proximity sensor, and an illuminance sensor. That is, each of the first camera unit 110 and the second camera unit 120 may include a sensor for measuring a distance. However, the present invention is not limited thereto. Moreover, for example, the portable device 100 may detect the first marker and the second marker in the front direction of the portable device by using the first camera unit 110 and the second camera unit 120.

Further, the portable device 100 may additionally include the display unit 130 as the optional configuration. In this case, the display unit 130 may display an indicator for indicating a photography mode. In addition, the display unit 130 may display a photography guide frame for indicating a photography mode and in this case, the photography guide frame may represent an image capturing area.

Further, the display unit can display at least one of a 2D image and a 3D image generated by the above-described first camera unit 110 and second camera unit 120. In this case, the display unit 130 may display a 3D object with a stereoscopic depth by synchronizing the above-mentioned left-eye image and right-eye image. For instance, the display unit 130 may set different depths for 3D objects in a 3D image based on the binocular parallax and then display the 3D object with the different depths. Here, the display unit 130 for displaying the 3D image may include at least one of a light emitting diode (LED), an organic light-emitting diode (OLED), a liquid crystal display (LCD), an electronic ink, and a flexible display. Moreover, the display unit 130 may include a touch-sensitive display and in this case, the display unit 130 may detect a touch input of touching the display unit. Furthermore, the display unit 130 may include a tactile display and in this case, the display unit 130 may provide tactile feedback to the user.

Further, the portable device 100 may additionally include the sensor unit 140 as an optional configuration.

In this case, the sensor unit 140 can detect at least one of distances and angles between the above-mentioned markers and the camera units 110 and 120. That is, the portable device 100 may detect the distances to the markers through the sensor unit without using the camera units 110 and 120. Here, the sensor unit may include an infrared sensor, a proximity sensor, an ultrasonic sensor, and an illuminance sensor. In addition, although the sensor unit may be configured to measure a distance, the present invention is not limited thereto. Moreover, the camera unit 110 and the sensor unit may be implemented as one integrated element but the present invention is not limited thereto.

As another example, the portable device 100 can detect a control input using the sensor unit 140. In this case, the control input may be an input for capturing an image. In addition, the control input may be an input for controlling a captured image. In other words, the portable device 100 can adjust the captured image through the sensor unit 140.

That is, the sensor unit 140 may sense external physical stimulation. Further, although the sensor unit 140 may include a plurality of sensors, the present invention is not limited thereto.

The portable device may include the processor 150. In this case, the processor 150 may control at least one of the first camera unit 110, the second camera unit 120, the display unit 130, and the sensor unit 140. In detail, the processor 150 may generate and transmit commands in order to control the above-mentioned units in accordance with operations performed by the portable device 100.

Specifically, the processor 150 can detect the first marker at the first distance from the portable device and the second marker at the second distance from the portable device using the camera units 110 and 120. For example, the first marker and the second marker may correspond to the user's hands. In detail, the portable device 100 may detect one of the user's hands as the first marker and the other hand as the second marker. In this case, if the first distance to the detected first marker and the second distance to the detected second marker are substantially the same, the portable device 100 may execute the 2D photography mode. Here, the substantially same distance may mean that the first marker and the second marker are located within the threshold distance. The processor 150 may capture an area established by the first marker and the second marker as a 2D image. On the other hand, if the first distance to the detected first marker is different from the second distance to the detected second marker, the processor 150 may execute the 3D photography mode. In other words, the processor may configure the photography mode based on the distances to the first marker and the second marker.

In addition, the processor 150 can capture a first image based on the first marker apart by the first distance by using the first camera unit 110 and a second image based on the second marker apart by the second distance by using the second camera unit 120. Thereafter, the processor 150 may generate a 3D image using the first image and the second image. In this case, the 3D image may be generated based on binocular parallax of the first camera unit 110 and the second camera unit 120.

Further, the above-mentioned elements may be included in the portable device 100 separately or by being integrated as one or more elements.

Figure 10:
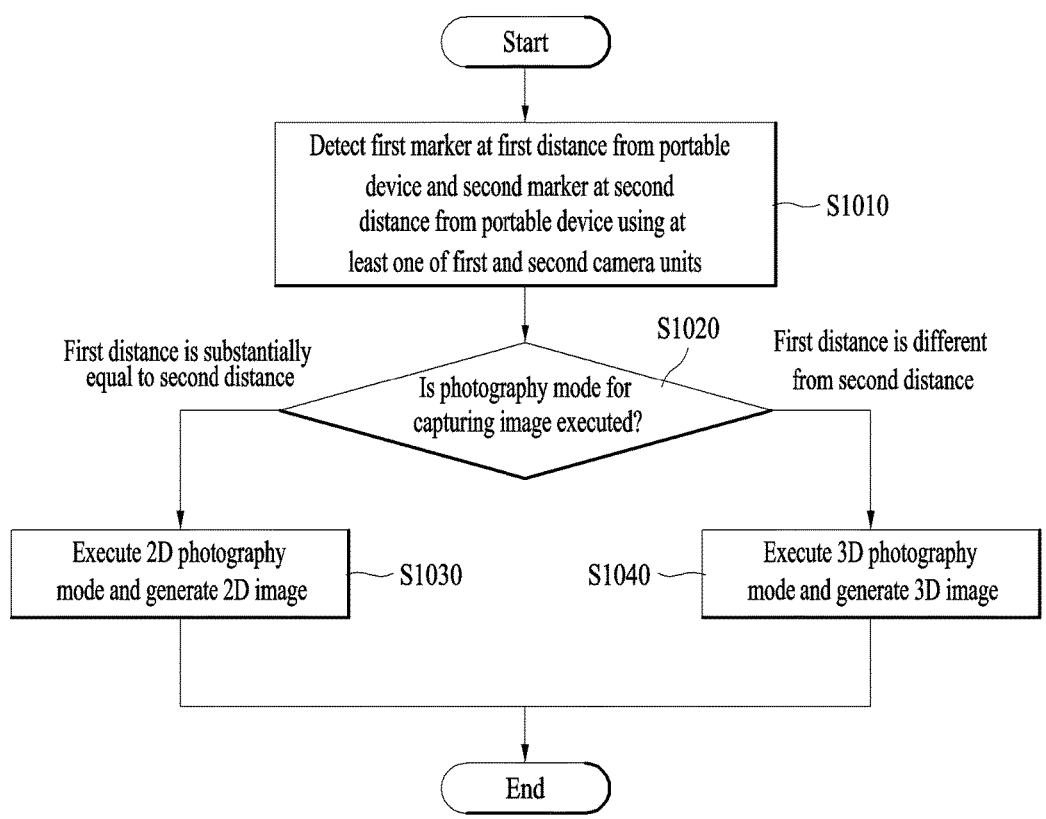
FIG. 10 is a flowchart illustrating a controlling method for a portable device according to one embodiment of the present invention.

FIG. 10 is a flowchart illustrating a controlling method for a portable device according to one embodiment of the present invention. The portable device 100 can detect the first marker at the first distance from the portable device and the second marker at the second distance from the portable device using at least one of the first camera units 110 and the second camera unit 120 [S1010]. As described with reference to FIGS. 3a and 3b, the first and second distances may be measured from the front side of the portable device 100. That is, each of the first and second distances may mean a distance measured from the front side of the portable device 100. In addition, the portable device 100 may configure the photography guide frame based on positions at which the first marker 210-1 and the second marker 210-2 are detected. The portable device 100 may display an image capturing area corresponding to the area within the first marker 210-1 and the second marker 210-2 through the photography guide frame.

Next, the portable device 100 can execute a photography mode for capturing an image [S1020]. As described above with reference to FIGS. 2a and 2b, if the first distance to the detected first marker 210-1 is substantially equal to the second distance to the detected second marker 210-2, the portable device 100 may execute a 2D photography mode and then capture a 2D image. That is, when the first marker 210-1 and the second marker 210-2 are located at the same distance from the portable device 100, the portable device 100 may capture an area within the first marker 210-1 and the second marker 210-2 as a 2D image. In this case, if the difference between the first distance and the second distance is below the threshold distance, the portable device 100 may determine that the first distance and the second distance are substantially equal to each other. In other words, if the two distances are within a margin of error, the portable device 100 may determine that the two distances are equal to each other and then execute the 2D photography mode. On the contrary, if the first distance to the first marker 210-1 is different from the second distance to the second marker 210-2, the portable device 100 may execute a 3D photography mode. In this case, the 3D photography mode may be a mode for capturing a 3D image. In detail, if the difference between the first distance and the second distance exceeds the threshold, the portable device 100 may determine that the first distance and the second distance are different from each other. In this case, the portable device 100 may capture a 3D image using the first camera unit 110 and the second camera unit 120.

The portable device 100 can execute the 2D photography mode and then capture a 2D image [S1030]. As described above with reference to FIGS. 2a and 2b, the 2D image may be configured based on the distances to the detected first marker 210-1 and second marker 210-2. In detail, the 2D image may be obtained by capturing the first object 230-1, the second object 230-2, the third object 230-3, and the background image 230-6 with reference to the distances to the first marker 210-1 and second marker 210-2 from the portable device 100. In other words, the first object 230-1, the second object 230-2, the third object 230-3 and the background image 230-6 may be captured at the same depth.

The portable device 100 can execute the 3D photography mode and then capture a 3D image [S1040]. As described above with reference to FIGS. 3a and 3b, the portable device 100 may generate a 3D image containing the first object 230-1, the second object 230-2, the third object 230-3, and the background image 230-6. In addition, the portable device 100 may set different depths for the respective objects based on the first distance and the second distance and such depths may be set with reference to the display unit 130. In detail, the portable device 100 may display a 3D object with a depth protruded towards the front side of the display unit 130. As another example, the portable device 100 may also display a 3D object with a depth dented towards the rear side of the display unit 130 based on positive binocular parallax. As described above, a depth protruded towards the front side of the display unit 130 can be referred to as (+) depth, a depth dented towards the rear side of the display unit 130 may be referred to as (−) depth, and a surface depth of the display unit 130 may be referred to as (0) depth.

FIG. 11 is a flowchart illustrating a controlling method for a portable device according to one embodiment of the present invention.

The portable device 100 can detect the first marker and the second marker using at least one of the first camera unit and the second camera unit [S1110]. In this case, the first and second distances may be measured from the front side of the portable device 100 as described with reference to FIGS. 3a and 3b. That is, each of the first and second distances may be measured from the front side of the portable device 100. In addition, the portable device 100 may configure the photography guide frame based on the positions at which the first marker 210-1 and the second marker 210-2 are detected. The portable device 100 may display the image capturing area corresponding to the area within the first marker 210-1 and the second marker 210-2 through the photography guide frame.

Next, the portable device 100 can detect whether the first distance to the first marker and the second distance to the second marker are substantially the same [S1120]. In this case, as described above with reference to FIGS. 8a and 8b, if the difference between the first distance and the second distance is below the threshold distance, the portable device 100 may determine that the first distance and the second distance are substantially equal to each other. In other words, if the two distances are within a margin of error, the portable device 100 may determine that the two distances are equal to each other and then execute the 2D photography mode. In this case, for example, if the first distance and the second distance are not substantially the same, the portable device may not execute a photography mode.

Thereafter, the portable device can execute the 2D photography mode based on the first marker and the second marker [S1130]. In this case, as described with reference to FIGS. 3a and 3b, the portable device 100 may capture a 2D image in the 2D photography mode using at least one of the first camera unit and the second camera unit. Here, the 2D photography mode may mean a mode for capturing a 2D image.

Subsequently, the portable device can detect that the first distance to the first marker and the second distance to the second marker are changed [S1140]. As described above with reference to FIGS. 8a and 8b, the portable device 100 may detect the changes in the first and second distances using at least one of the first camera unit 110 and the second camera unit 120. As another example, the portable device 100 may detect the changes in the first and second distances using the sensor unit 140.

After the step S1140, the portable device 100 can detect whether the distance difference between the first distance and the second distance exceeds the threshold distance [S1150]. As described above with reference to FIGS. 8a and 8b, the threshold distance corresponds to a value for determining whether to switch from the 2D photography mode to the 3D photography mode and it may have a certain margin of error. Moreover, the above-mentioned threshold distance may be configured by the user or the processor.

Thereafter, the portable device 100 can switch from the 2D photography mode to the 3D photography mode [S1160]. As described above with reference to FIGS. 8a and 8b, after switching from the 2D photography mode to the 3D photography mode, the portable device 100 may further detect that the distance difference between the first distance to the first marker and the second distance to the second marker is changed. In this case, for instance, if the distance difference between the first distance and the second distance increases, the portable device 100 may adjust a depth of a 3D image. On the other hand, if the distance difference between the first distance and the second distance decrease and thus the difference becomes less than the threshold distance, the portable device 100 may return to the 2D photography mode.

For convenience of description, although the description has been made for each of the drawings, the embodiments of the respective drawings may be incorporated to achieve a new embodiment. As needed by those skilled in the art, designing a computer-readable recording medium, in which a program for implementing the above-described embodiments is recorded, is within the scope of the present invention.

The portable device 100 and controlling method therefor according to the present invention are not limited to the aforementioned embodiments and all or some of the aforementioned embodiments may be selectively combined to achieve various modifications.

Meanwhile, the controlling method for the portable device 100 may be implemented as code that can be written on a processor-readable recording medium and thus read by a processor provided in a network device. The processor-readable recording medium may include all kinds of recording media where data that can be read by the processor are stored. The processor-readable recording medium may include, for example a ROM, a RAM, a magnetic tape, a floppy disk, and an optical data memory and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

It will be apparent that, although the preferred embodiments have been shown and described above, the present specification is not limited to the above-described specific embodiments, and various modifications and variations can be made by those skilled in the art to which the present invention pertains without departing from the gist of the appended claims. Thus, it is intended that the modifications and variations should not be understood independently of the technical spirit or prospect of the present specification.

In addition, the present specification describes both a product invention and a method invention, and descriptions of both the inventions may be complementarily applied as needed.

INDUSTRIAL APPLICABILITY

The present invention has industrial applicability in that the invention can be applied to a terminal device in a reproducible manner.

What is claimed is:

1. A portable device, comprising:
   first and second camera units configured to capture images; and
   a processor configured to control the first and second camera units, wherein the processor:
   detects a first marker positioned at a first distance from the portable device and a second marker positioned at a second distance from the portable device by using at least one of the first and second camera units;
   executes a 2D photography mode if the first distance to the detected first marker is equal to the second distance to the detected second marker;
   executes a 3D photography mode if the first distance to the detected first marker is different from the second distance to the detected second marker;
   detects that at least one of the first distance to the first marker and the second distance to the second marker is changed in a state where the 2D photography mode is switched to the 3D photography mode; and
   adjusts a depth of a 3D image based on a distance difference between the first and second distances,
   wherein the 3D image contains a first 3D object corresponding to a first real object and a second 3D object corresponding to a second real object, and
   wherein the 3D photography mode is a mode for generating the 3D image by using binocular parallax of the first and second camera units.

2. The portable device of claim 1, wherein when executing the 3D photography mode, the processor generates the 3D image based on the distance difference between the first and second distances.

3. The portable device of claim 1, wherein the processor:
   generates the 3D image by focusing on the first 3D object if the distance difference between the first and second distances is equal to or smaller than a first threshold distance; and
   generates the 3D image by focusing on the second 3D object if the distance difference between the first and second distances is greater than the first threshold distance.

4. The portable device of claim 1, wherein when generating the 3D image, the processor sets the first 3D object to have a first depth and the second 3D object to have a second depth.

5. The portable device of claim 4, wherein the processor sets the first and second depths based on the first and second distances, respectively.

6. The portable device of claim 5, wherein if the distance difference between the first and second distances increases, the processor increases a depth difference between the first and second depths.

7. The portable device of claim 5, wherein if the first distance is greater than the second distance, the first depth of the first 3D object is set to be greater than the second depth of the second 3D object and
   wherein if the first distance is smaller than the second distance, the first depth of the first 3D object is set to be smaller than the second depth of the second 3D object.

8. The portable device of claim 1, wherein when executing the 3D photography mode, the processor captures first and second 2D images by using the at least one of the first and second camera units,
   wherein the first 2D image is an image captured based on the first distance, and
   wherein the second 2D image is an image captured based on the second distance.

9. The portable device of claim 8, wherein the processor generates the 3D image by using the captured first and second 2D images.

10. The portable device of claim 1, the portable device further comprising a display unit configured to display a photography guide frame as an augmented reality image.

11. The portable device of claim 10, wherein the processor sets the photography guide frame based on positions at which the first and second markers are detected and
wherein the photography guide frame indicates an area to be captured as a 2D or 3D image.

12. The portable device of claim 10, wherein the processor further displays a photography mode indicator by using the display unit and
wherein the photography mode indicator is an indicator for indicating an executed photography mode.

13. The portable device of claim 1, wherein the processor:
sets a capturing area based on the first and second markers; and
generates a 2D or 3D image based on the capturing area.

14. The portable device of claim 1, wherein the 3D image contains the first 3D object with a first depth and the second 3D object with a second depth and
wherein if the distance difference between the first and second distances increases, the processor increases a depth difference between the first and second depths.

15. The portable device of claim 1, wherein the processor returns to the 2D photography mode if detecting that the distance difference between the first and second distances is equal to or smaller than the threshold distance.

16. A controlling method for a portable device, the method comprising:
detecting a first marker positioned at a first distance from the portable device and a second marker positioned at a second distance from the portable device by using at least one of first and second camera units;
executing a photography mode for capturing an image;
detecting that at least one of the first distance to the first marker and the second distance to the second marker is changed in a state where a 2D photography mode is switched to a 3D photography mode; and
adjusting a depth of a 3D image based on a distance difference between the first and second distances,
wherein the 3D image contains a first 3D object corresponding to a first real object and a second 3D object corresponding to a second real object,
wherein if the first distance to the detected first marker is equal to the second distance to the detected second marker, the 2D photography mode is executed,
wherein if the first distance to the detected first marker is different from the second distance to the detected second marker, the 3D photography mode is executed, and
wherein the 3D photography mode is a mode for generating the 3D image by using binocular parallax of the first and second camera units.

17. The controlling method according to claim 16, wherein the adjusting the depth of the 3D image includes individually adjusting the depth of the first 3D object to be a first depth based on the first distance and the second 3D object to be a second depth based on the second distance.

* * * * *